(12) United States Patent
Bern et al.

(10) Patent No.: US 10,291,560 B2
(45) Date of Patent: *May 14, 2019

(54) INTEGRATED REAL-TIME EMAIL-BASED VIRTUAL CONVERSATION

(71) Applicants: Assaf Yossef Bern, Rishon Lezion (IL); Ofir Eliasi, Holon (IL); Amit Frenkel, Ramat Gan (IL); Guy Raviv, Shoham (IL)

(72) Inventors: Assaf Yossef Bern, Rishon Lezion (IL); Ofir Eliasi, Holon (IL); Amit Frenkel, Ramat Gan (IL); Guy Raviv, Shoham (IL)

(73) Assignee: REDKIX, INC. DE (US)

(*) Notice: Subject to any disclaimer, the term of this patent is extended or adjusted under 35 U.S.C. 154(b) by 186 days.

This patent is subject to a terminal disclaimer.

(21) Appl. No.: 15/071,132

(22) Filed: Mar. 15, 2016

(65) Prior Publication Data
US 2017/0272388 A1 Sep. 21, 2017

(51) Int. Cl.
*H04L 12/58* (2006.01)
*H04L 29/08* (2006.01)
*H04L 29/06* (2006.01)

(52) U.S. Cl.
CPC ............ *H04L 51/046* (2013.01); *H04L 51/04* (2013.01); *H04L 51/12* (2013.01); *H04L 51/16* (2013.01); *H04L 51/22* (2013.01); *H04L 51/32* (2013.01); *H04L 51/36* (2013.01); *H04L 67/10* (2013.01); *H04L 29/06312* (2013.01)

(58) Field of Classification Search
CPC ........... G06F 11/2066; G06F 17/30575; G06F 17/30578; G06F 21/51; G06Q 10/0633; G06Q 30/0631; H04L 41/5054; H04L 51/22; H04L 63/0227; H04L 63/101; H04L 63/104; H04L 67/10; H04L 51/046; H04L 51/36; H04L 51/16; H04L 51/12; H04L 51/32; H04L 51/04; H04L 29/06312

See application file for complete search history.

(56) References Cited

U.S. PATENT DOCUMENTS

| | | | |
|---|---|---|---|
| 9,369,433 B1* | 6/2016 | Paul | H04L 63/0227 |
| 2010/0235431 A1* | 9/2010 | Poluri | G06F 11/2066 |
| | | | 709/203 |
| 2013/0212200 A1* | 8/2013 | Dennis | H04L 51/22 |
| | | | 709/206 |

(Continued)

*Primary Examiner* — Le H Luu
(74) *Attorney, Agent, or Firm* — Farjam Majd; Arjomand Law Group

(57) ABSTRACT

A method and a system are disclosed including software and hardware components implementing a Universal Email Platform (UEP) that allows communications between UEP and other existing email platforms, communication between multiple UEP clients, or combinations of existing and UEP email clients via the UEP and also existing email platforms. The UEP creates a global virtual single conversation in two phases. In Phase I, emails that are part of the same exchange and are associated with one mailbox are linked together to create a local virtual conversation of the one mailbox. In Phase II, multiple local virtual conversations are linked together to create a global virtual single conversation that connects all participants from local and remote mail servers in one conversation.

19 Claims, 14 Drawing Sheets

(56) References Cited

U.S. PATENT DOCUMENTS

| | | | | |
|---|---|---|---|---|
| 2014/0026179 A1* | 1/2014 | Devarajan | G06F 21/51 | 726/1 |
| 2014/0201145 A1* | 7/2014 | Dorman | G06F 17/30174 | 707/634 |
| 2014/0236663 A1* | 8/2014 | Smith | G06Q 10/0633 | 705/7.27 |
| 2014/0279201 A1* | 9/2014 | Iyoob | G06Q 30/0631 | 705/26.7 |
| 2014/0365662 A1* | 12/2014 | Dave | G06F 9/45533 | 709/226 |
| 2014/0372376 A1* | 12/2014 | Smith | G06F 17/30174 | 707/624 |
| 2015/0033297 A1* | 1/2015 | Sanso | H04L 63/104 | 726/5 |
| 2015/0156065 A1* | 6/2015 | Grandhe | H04L 41/5054 | 709/224 |
| 2016/0036833 A1* | 2/2016 | Ardeli | H04L 63/1408 | 726/22 |

* cited by examiner

INTEGRATED REAL-TIME EMAIL-BASED VIRTUAL CONVERSATION

CROSS-REFERENCE(S) TO RELATED APPLICATION(S)

This application is a Continuation-In-Part (CIP) of the non-provisional U.S. application Ser. No. 14/705,947, filed on 6 May 2015, titled "INTEGRATED REAL-TIME DIGITAL COMMUNICATION PLATFORM," the disclosure of which is hereby expressly incorporated by reference in its entirety, and the benefit of the filing date of which is hereby claimed under 35 U.S.C. § 119(e).

TECHNICAL FIELD

This application relates generally to communication. More specifically, this application relates to using an integrated digital communication platform to create one virtual conversation from multiple related emails.

BRIEF DESCRIPTION OF THE DRAWINGS

The drawings, when considered in connection with the following description, are presented for the purpose of facilitating an understanding of the subject matter sought to be protected.

DETAILED DESCRIPTION

Figure 1:
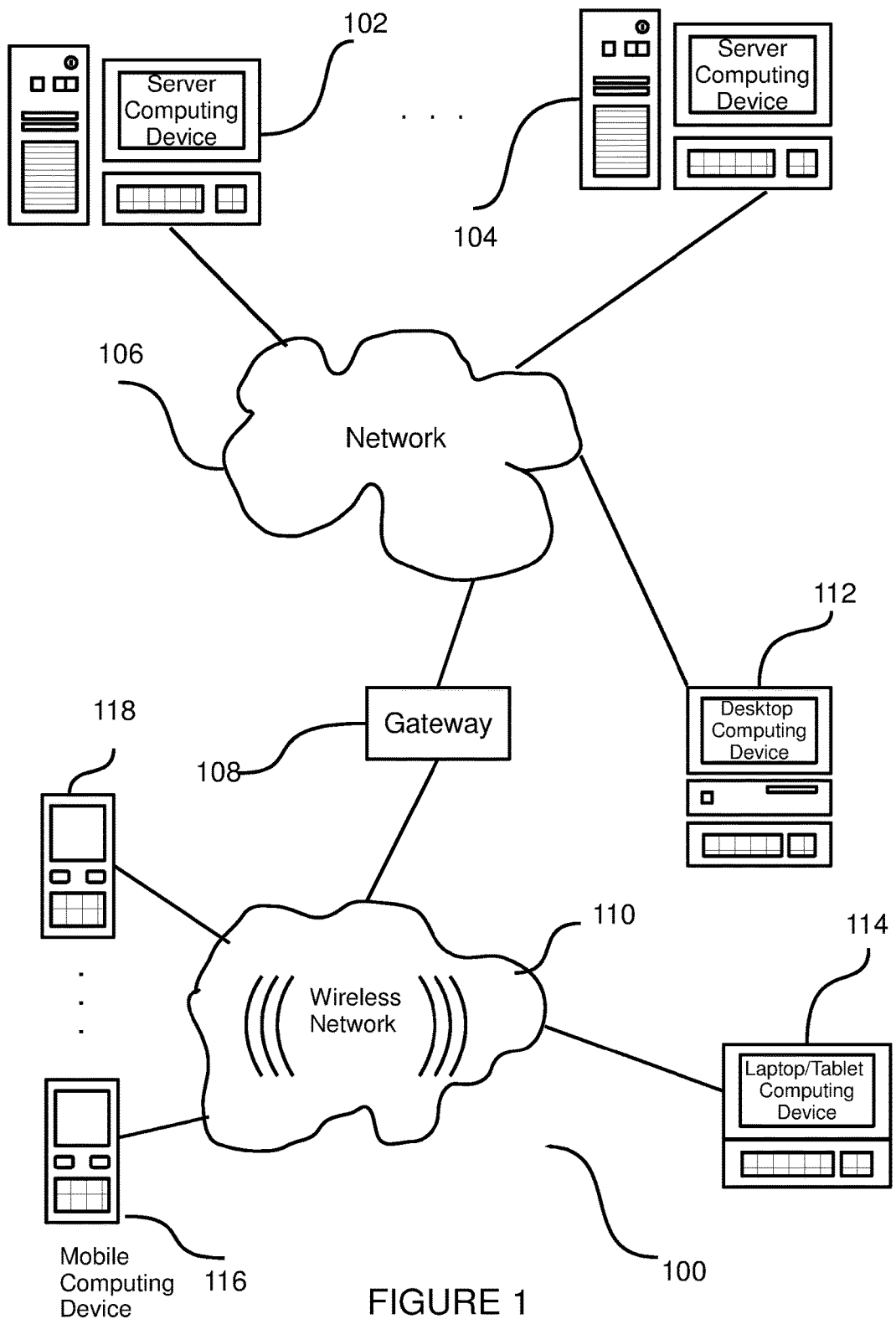
FIG. 1 shows an embodiment of a network computing environment wherein the disclosure may be practiced.

While the present disclosure is described with reference to several illustrative embodiments described herein, it should be clear that the present disclosure should not be limited to such embodiments. Therefore, the description of the embodiments provided herein is illustrative of the present disclosure and should not limit the scope of the disclosure as claimed. In addition, while following description references particular communication methods such as email, it will be appreciated that the disclosure may be used with other types of communications such as voice, instant messaging, social networking, and the like.

Briefly described, a device and a method are disclosed including software and hardware components implementing a Universal Email Platform (UEP) that allows communications between UEP and other existing email platforms, communication between multiple UEP clients, or combinations of existing and UEP email clients via the UEP and also existing email platforms. The UEP creates a global virtual single conversation in two phases. In Phase I, emails that are part of the same exchange and are associated with one mailbox are linked together to create a local virtual conversation of the one mailbox. In Phase II, multiple local virtual conversations are linked together to create a global virtual single conversation that connects all participants from local and remote mailboxes and mail servers in one conversation. Unlike traditional/existing/standard email platforms that send copies of email messages, UEP system is a communication and collaboration platform that creates a virtual single-threaded conversation that allows interactions between various communication clients, whether UEP clients or existing/different platform clients, as a real-time, ongoing stream of communications, in which people may enter an ongoing conversation in the computing cloud and have access to the history or thread of communications prior to their joining the communication session. In various embodiments, a mid-layer architecture allows UEP to seamlessly communicate through multiple other existing or new email platforms. In various embodiments, UEP uses existing email addresses, for UEP clients or other platform clients, as the unique ID of the email client. In various embodiments, the cloud-based conversation may be split or nested allowing side conversations to separate from the main session. In some embodiments, filters may be employed to filter email contents based on participants, subject, attachments, and the like. In other embodiments, a user may search for threads based on various criteria such as date range, sender, receiver, subject, attachments and other parameters. Search may be for one thread among others or inside threads.

Cloud computing refers to managed hardware and software applications and data that are accessed remotely via the web in contrast to applications residing and accessed locally on a user's computer. Cloud computing is not the same as client-server model, or computer networking, but it may include aspects of both of them. It is a computing model that includes hardware, software, data storage, and ownership, maintenance, and management of these physical resources. Some or all of the physical resources employed in a cloud environment may be owned and operated by third party service providers, which then provide services to customers or users, which may be individuals, corporations, enterprises, or other entities. So, it is more comprehensive and flexible/configurable than just client-server model, or network protocols. Some cloud computing solutions enable users to share and work together on documents while others let users store content and files on a location that is accessible from any computer. The UEP disclosed herein substantially uses cloud computing functionality to implement real-time communications in a platform-independent manner as viewed from the user's perspective.

A number of email servers and platforms are available that serve existing users, such as Microsoft's Exchange server, and Google's Gmail. However, since email is an open platform with standard protocols, the possibility of a third person, other than the initiators of an email thread, being added to the conversation must be taken into consideration. And because the third person might be using another email system, email platforms are forced to chose the lowest common denominator in terms of functionality and capability.

It is desirable to have an email platform without having to choose a lowest common denominator, while also seamlessly supporting interactions between a new modern platform and a standard or legacy email system.

Illustrative Operating Environment

FIG. 1 shows components of an illustrative environment in which the disclosure may be practiced. Not all the shown components may be required to practice the disclosure, and variations in the arrangement and type of the components may be made without departing from the spirit or scope of the disclosure. System 100 may include Local Area Networks (LAN) and Wide Area Networks (WAN) shown collectively as Network 106, wireless network 110, gateway 108 configured to connect remote and/or different types of networks together, client computing devices 112-118, and server computing devices 102-104.

One embodiment of a computing device usable as one of client computing devices 112-118 is described in more detail below with respect to FIG. 2. Briefly, however, client computing devices 112-118 may include virtually any device capable of receiving and sending a message over a network, such as wireless network 110, or the like. Such devices include portable devices such as, cellular telephones, smart phones, display pagers, radio frequency (RF) devices, music players, digital cameras, infrared (IR) devices, Personal Digital Assistants (PDAs), handheld computers, laptop computers, wearable computers, tablet computers, integrated devices combining one or more of the preceding devices, or the like. Client device 112 may include virtually any computing device that typically connects using a wired communications medium such as personal computers, multiprocessor systems, microprocessor-based or programmable consumer electronics, network PCs, or the like. In one embodiment, one or more of client devices 112-118 may also be configured to operate over a wired and/or a wireless network.

Client devices 112-118 typically range widely in terms of capabilities and features. For example, a cell phone may have a numeric keypad and a few lines of monochrome LCD display on which only text may be displayed. In another example, a web-enabled client device may have a touch sensitive screen, a stylus, and several lines of color LCD display in which both text and graphic may be displayed.

A web-enabled client device may include a browser application that is configured to receive and to send web pages, web-based messages, or the like. The browser application may be configured to receive and display graphic, text, multimedia, or the like, employing virtually any web based language, including a wireless application protocol messages (WAP), or the like. In one embodiment, the browser application may be enabled to employ one or more of Handheld Device Markup Language (HDML), Wireless Markup Language (WML), WMLScript, JavaScript, Standard Generalized Markup Language (SMGL), HyperText Markup Language (HTML), eXtensible Markup Language (XML), or the like, to display and send information.

Client computing devices 12-118 also may include at least one other client application that is configured to receive content from another computing device, including, without limit, server computing devices 102-104. The client application may include a capability to provide and receive textual content, multimedia information, or the like. The client application may further provide information that identifies itself, including a type, capability, name, or the like. In one embodiment, client devices 112-118 may uniquely identify themselves through any of a variety of mechanisms, including a phone number, Mobile Identification Number (MIN), an electronic serial number (ESN), mobile device identifier, network address, such as IP (Internet Protocol) address, Media Access Control (MAC) layer identifier, or other identifier. The identifier may be provided in a message, or the like, sent to another computing device.

Client computing devices 112-118 may also be configured to communicate a message, such as through email, Short Message Service (SMS), Multimedia Message Service (MMS), instant messaging (IM), internet relay chat (IRC), Mardam-Bey's IRC (mIRC), Jabber, or the like, to another computing device. However, the present disclosure is not limited to these message protocols, and virtually any other message protocol may be employed.

Client devices 112-118 may further be configured to include a client application that enables the user to log into a user account that may be managed by another computing device. Such user account, for example, may be configured to enable the user to receive emails, send/receive IM messages, SMS messages, access selected web pages, download scripts, applications, or a variety of other content, or perform a variety of other actions over a network. However, managing of messages or otherwise accessing and/or downloading content, may also be performed without logging into the user account. Thus, a user of client devices 112-118 may employ any of a variety of client applications to access content, read web pages, receive/send messages, or the like. In one embodiment, for example, the user may employ a browser or other client application to access a web page hosted by a Web server implemented as server computing device 102. In one embodiment, messages received by client computing devices 112-118 may be saved in non-volatile memory, such as flash and/or PCM, across communication sessions and/or between power cycles of client computing devices 112-118.

Wireless network 110 may be configured to couple client devices 114-118 to network 106. Wireless network 110 may include any of a variety of wireless sub-networks that may further overlay stand-alone ad-hoc networks, and the like, to provide an infrastructure-oriented connection for client devices 114-118. Such sub-networks may include mesh networks, Wireless LAN (WLAN) networks, cellular networks, and the like. Wireless network 110 may further include an autonomous system of terminals, gateways, routers, and the like connected by wireless radio links, and the like. These connectors may be configured to move freely and randomly and organize themselves arbitrarily, such that the topology of wireless network 110 may change rapidly.

Wireless network 110 may further employ a plurality of access technologies including 2nd (2G), 3rd (3G) generation radio access for cellular systems, WLAN, Wireless Router (WR) mesh, and the like. Access technologies such as 2G, 3G, and future access networks may enable wide area coverage for mobile devices, such as client devices 114-118 with various degrees of mobility. For example, wireless network 110 may enable a radio connection through a radio network access such as Global System for Mobil communication (GSM), General Packet Radio Services (GPRS), Enhanced Data GSM Environment (EDGE), WEDGE, Bluetooth, High Speed Downlink Packet Access (HSDPA), Universal Mobile Telecommunications System (UMTS), Wi-Fi, Zigbee, Wideband Code Division Multiple Access (WCDMA), and the like. In essence, wireless network 110 may include virtually any wireless communication mechanism by which information may travel between client devices 102-104 and another computing device, network, and the like.

Network 106 is configured to couple one or more servers depicted in FIG. 1 as server computing devices 102-104 and their respective components with other computing devices, such as client device 112, and through wireless network 110 to client devices 114-118. Network 106 is enabled to employ any form of computer readable media for communicating information from one electronic device to another. Also, network 106 may include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another.

Communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. Network 106 may include any communication method by which information may travel between computing devices. Additionally, communication media typically may enable transmission of computer-readable instructions, data structures, program modules, or other types of content, virtually without limit. By way of example, communication media includes wired media such as twisted pair, coaxial cable, fiber optics, wave guides, and other wired media and wireless media such as acoustic, RF, infrared, and other wireless media.

Illustrative Computing Device Configuration

Figure 2:
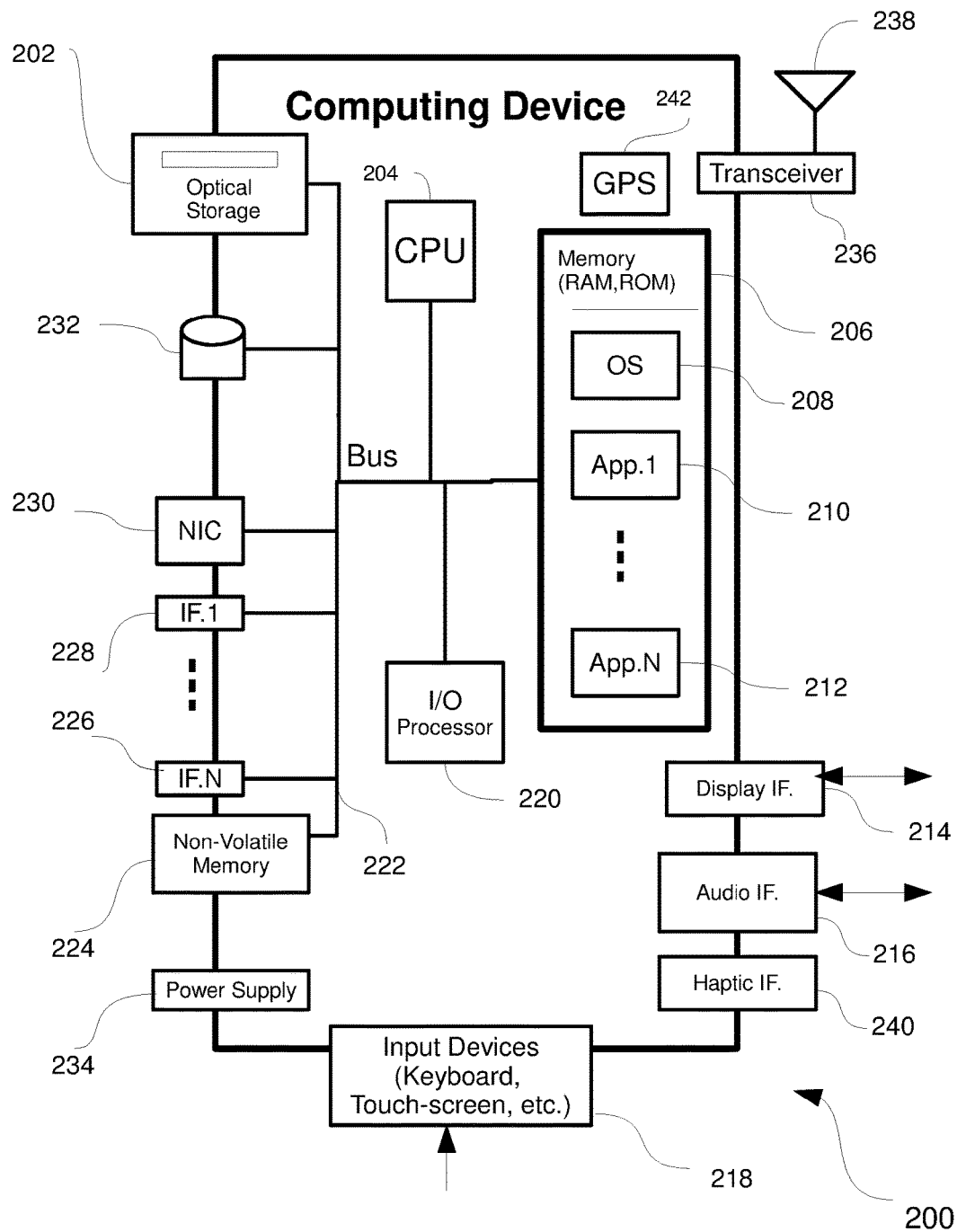
FIG. 2 shows an embodiment of a computing device that may be used in the network computing environment of FIG. 1.

FIG. 2 shows an illustrative computing device 200 that may represent any one of the server and/or client computing devices shown in FIG. 1. A computing device represented by computing device 200 may include less or more than all the components shown in FIG. 2 depending on the functionality needed. For example, a mobile computing device may include the transceiver 236 and antenna 238, while a server computing device 102 of FIG. 1 may not include these components. Those skilled in the art will appreciate that the scope of integration of components of computing device 200 may be different from what is shown. As such, some of the components of computing device 200 shown in FIG. 2 may be integrated together as one unit. For example, NIC 230 and transceiver 236 may be implemented as an integrated unit. Additionally, different functions of a single component may be separated and implemented across several components instead. For example, different functions of I/O processor 220 may be separated into two or more processing units.

With continued reference to FIG. 2, computing device 200 includes optical storage 202, Central Processing Unit (CPU) 204, memory module 206, display interface 214, audio interface 216, input devices 218, Input/Output (I/O) processor 220, bus 222, non-volatile memory 224, various other interfaces 226-228, Network Interface Card (NIC) 320, hard disk 232, power supply 234, transceiver 236, antenna 238, haptic interface 240, and Global Positioning System (GPS) unit 242. Memory module 206 may include software such as Operating System (OS) 208, and a variety of software application programs 210-212. Computing device 200 may also include other components not shown in FIG. 2. For example, computing device 200 may further include an illuminator (for example, a light), graphic interface, and portable storage media such as USB drives. Computing device 200 may also include other processing units, such as a math co-processor, graphics processor/accelerator, and a Digital Signal Processor (DSP).

Optical storage device 202 may include optical drives for using optical media, such as CD (Compact Disc), DVD (Digital Video Disc), and the like. Optical storage devices 202 may provide inexpensive ways for storing information for archival and/or distribution purposes.

Central Processing Unit (CPU) 204 may be the main processor for software program execution in computing device 200. CPU 204 may represent one or more processing units that obtain software instructions from memory module 206 and execute such instructions to carry out computations and/or transfer data between various sources and destinations of data, such as hard disk 232, I/O processor 220, display interface 214, input devices 218, non-volatile memory 224, and the like.

Memory module 206 may include RAM (Random Access Memory), ROM (Read Only Memory), and other storage means, mapped to one addressable memory space. Memory module 206 illustrates one of many types of computer storage media for storage of information such as computer readable instructions, data structures, program modules or other data. Memory module 206 may store a basic input/output system (BIOS) for controlling low-level operation of computing device 200. Memory module 206 may also store OS 208 for controlling the general operation of computing device 200. It will be appreciated that OS 208 may include a general-purpose operating system such as a version of UNIX, or LINUX™, or a specialized client communication operating system such as Windows Mobile™, or the Symbian® operating system. OS 208 may, in turn, include or interface with a Java virtual machine (JVM) module that enables control of hardware components and/or operating system operations via Java application programs.

Memory module 206 may further include one or more distinct areas (by address space and/or other means), which can be utilized by computing device 200 to store, among other things, applications and/or other data. For example, one area of memory module 206 may be set aside and employed to store information that describes various capabilities of computing device 200, a device identifier, and the like. Such identification information may then be provided to another device based on any of a variety of events, including being sent as part of a header during a communication, sent upon request, or the like. One common software application is a browser program that is generally used to send/receive information to/from a web server. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), and the like, to display and send a message. However, any of a variety of other web based languages may also be employed. In one embodiment, using the browser application, a user may view an article or other content on a web page with one or more highlighted portions as target objects.

Display interface 214 may be coupled with a display unit (not shown), such as liquid crystal display (LCD), gas plasma, light emitting diode (LED), or any other type of display unit that may be used with computing device 200. Display units coupled with display interface 214 may also include a touch sensitive screen arranged to receive input from an object such as a stylus or a digit from a human hand. Display interface 214 may further include interface for other visual status indicators, such Light Emitting Diodes (LED), light arrays, and the like. Display interface 214 may include both hardware and software components. For example, display interface 214 may include a graphic accelerator for rendering graphic-intensive outputs on the display unit. In one embodiment, display interface 214 may include software and/or firmware components that work in conjunction with CPU 204 to render graphic output on the display unit.

Audio interface 216 is arranged to produce and receive audio signals such as the sound of a human voice. For example, audio interface 216 may be coupled to a speaker and microphone (not shown) to enable communication with a human operator, such as spoken commands, and/or generate an audio acknowledgement for some action.

Input devices 218 may include a variety of device types arranged to receive input from a user, such as a keyboard, a keypad, a mouse, a touchpad, a touch-screen (described with respect to display interface 214), a multi-touch screen, a microphone for spoken command input (describe with respect to audio interface 216), and the like.

I/O processor 220 is generally employed to handle transactions and communications with peripheral devices such as mass storage, network, input devices, display, and the like, which couple computing device 200 with the external world. In small, low power computing devices, such as some mobile devices, functions of the I/O processor 220 may be integrated with CPU 204 to reduce hardware cost and complexity. In one embodiment, I/O processor 220 may be the primary software interface with all other device and/or hardware interfaces, such as optical storage 202, hard disk 232, interfaces 226-228, display interface 214, audio interface 216, and input devices 218.

An electrical bus 222 internal to computing device 200 may be used to couple various other hardware components, such as CPU 204, memory module 206, I/O processor 220, and the like, to each other for transferring data, instructions, status, and other similar information.

Non-volatile memory 224 may include memory built into computing device 200, or portable storage medium, such as USB drives that may include PCM arrays, flash memory including NOR and NAND flash, pluggable hard drive, and the like. In one embodiment, portable storage medium may behave similarly to a disk drive. In another embodiment, portable storage medium may present an interface different than a disk drive, for example, a read-only interface used for loading/supplying data and/or software.

Various other interfaces 226-228 may include other electrical and/or optical interfaces for connecting to various hardware peripheral devices and networks, such as IEEE 1394 also known as FireWire, Universal Serial Bus (USB), Small Computer Serial Interface (SCSI), parallel printer interface, Universal Synchronous Asynchronous Receiver Transmitter (USART), Video Graphics Array (VGA), Super VGA (SVGA), and the like.

Network Interface Card (NIC) 230 may include circuitry for coupling computing device 200 to one or more networks, and is generally constructed for use with one or more communication protocols and technologies including, but not limited to, Global System for Mobile communication (GSM), code division multiple access (CDMA), time division multiple access (TDMA), user datagram protocol (UDP), transmission control protocol/Internet protocol (TCP/IP), SMS, general packet radio service (GPRS), WAP, ultra wide band (UWB), IEEE 802.16 Worldwide Interoperability for Microwave Access (WiMax), SIP/RTP, Bluetooth, Wi-Fi, Zigbee, UMTS, HSDPA, WCDMA, WEDGE, or any of a variety of other wired and/or wireless communication protocols.

Hard disk 232 is generally used as a mass storage device for computing device 200. In one embodiment, hard disk 232 may be a Ferro-magnetic stack of one or more disks forming a disk drive embedded in or coupled to computing device 200. In another embodiment, hard drive 232 may be implemented as a solid-state device configured to behave as a disk drive, such as a flash-based hard drive. In yet another embodiment, hard drive 232 may be a remote storage accessible over network interface 230 or another interface 226, but acting as a local hard drive. Those skilled in the art will appreciate that other technologies and configurations may be used to present a hard drive interface and functionality to computing device 200 without departing from the spirit of the present disclosure.

Power supply 234 provides power to computing device 200. A rechargeable or non-rechargeable battery may be used to provide power. The power may also be provided by an external power source, such as an AC adapter or a powered docking cradle that supplements and/or recharges a battery.

Transceiver 236 generally represents transmitter/receiver circuits for wired and/or wireless transmission and receipt of electronic data. Transceiver 236 may be a stand-alone module or be integrated with other modules, such as NIC 230. Transceiver 236 may be coupled with one or more antennas for wireless transmission of information.

Antenna 238 is generally used for wireless transmission of information, for example, in conjunction with transceiver 236, NIC 230, and/or GPS 242. Antenna 238 may represent one or more different antennas that may be coupled with different devices and tuned to different carrier frequencies configured to communicate using corresponding protocols and/or networks. Antenna 238 may be of various types, such as omni-directional, dipole, slot, helical, and the like.

Haptic interface 240 is configured to provide tactile feedback to a user of computing device 200. For example, the haptic interface may be employed to vibrate computing device 200, or an input device coupled to computing device 200, such as a game controller, in a particular way when an event occurs, such as hitting an object with a car in a video game.

Global Positioning System (GPS) unit 242 can determine the physical coordinates of computing device 200 on the surface of the Earth, which typically outputs a location as latitude and longitude values. GPS unit 242 can also employ other geo-positioning mechanisms, including, but not limited to, triangulation, assisted GPS (AGPS), E-OTD, CI, SAI, ETA, BSS or the like, to further determine the physical location of computing device 200 on the surface of the Earth. It is understood that under different conditions, GPS unit 242 can determine a physical location within millimeters for computing device 200. In other cases, the determined physical location may be less precise, such as within a meter or significantly greater distances. In one embodiment, however, a mobile device represented by computing device 200 may, through other components, provide other information that may be employed to determine a physical location of the device, including for example, a MAC address.

Figure 3:
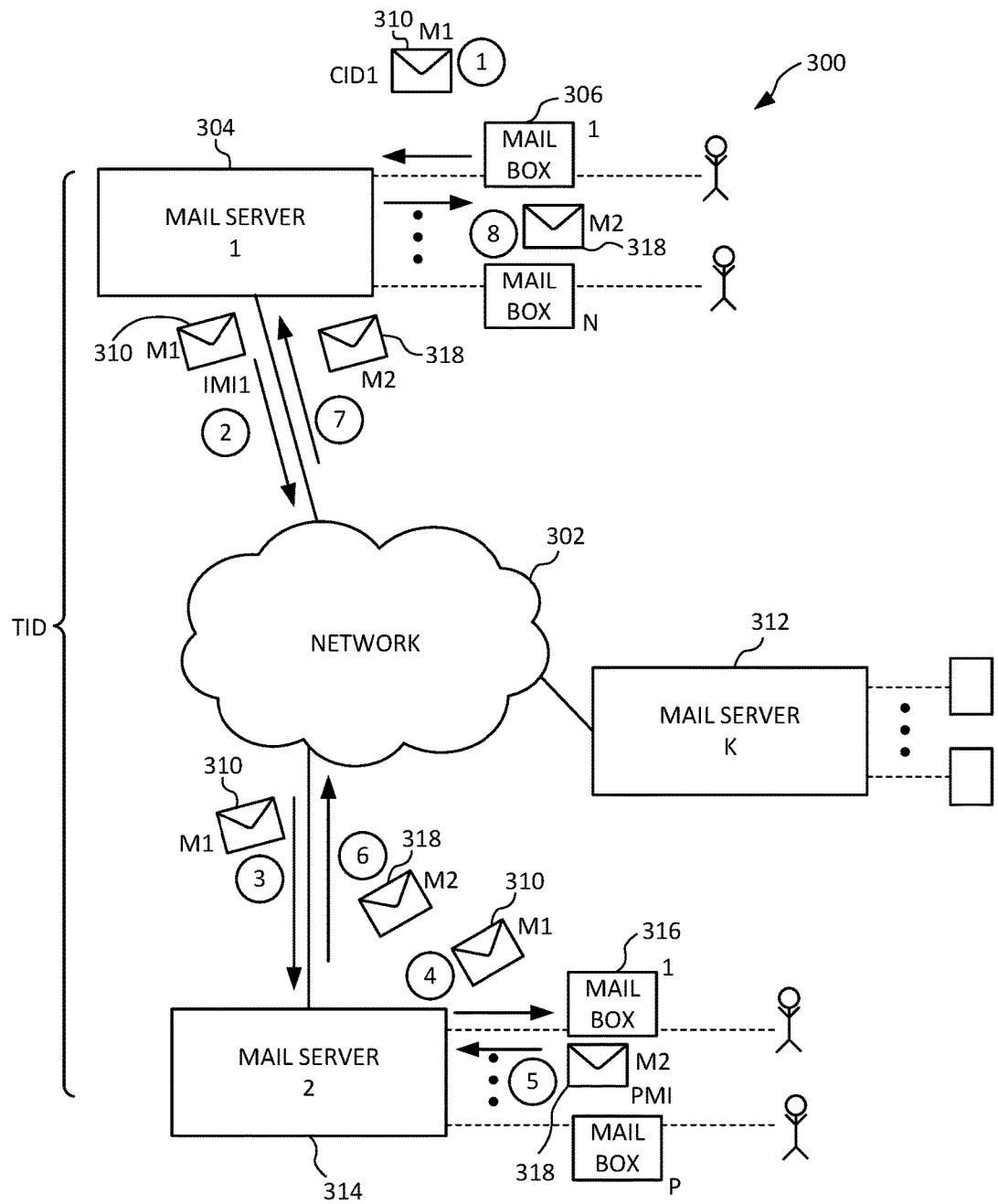
FIG. 3 shows an example email system with various message IDs usable for creating a virtual conversation from multiple related email messages.

FIG. 3 shows an example email system with various message IDs usable for creating a virtual conversation from multiple related email messages. In various embodiments, email system 300 includes mail server 304 coupled with multiple mailboxes 306 numbered 1 to N with corresponding users 308, usable for sending email message 310 via network paths to other mail servers and corresponding mailboxes also coupled to computer network 302. Network 302 is in turn coupled with many other mail servers 312 and 314, each mail server coupled with multiple other mailboxes 316 numbered 1 to P for mail server 314. Mailboxes such as 314 configured to send reply messages 318 in response to email message 310 back to originating mailboxes 306. A Thread ID, TID, may be assigned by the UEP system to the communication thread including email messages going back and forth between two or more mailboxes in the same communication session. Various components in the system may assign various IDs to a message at different stages of transmission of the message. These IDs may include a Conversation ID (CID), an Internet Message ID (IMI), a Parent Message ID (PMI), a Reference ID (RID), and thread ID (TID), more fully described below.

Those skilled in the art will appreciate that the basic email system architecture includes some of the elements shown in FIG. 3 plus other software and/or hardware modules not shown. These modules may include various software agents that function in one way or another to deliver an email message from one user to another across a computer network, such as the Internet. These software agents may include a Mail User Agent (MUA), which provides a user environment for accessing the user's mailbox. MUA implements some or all of the typical functions of client email applications, such as Microsoft Outlook or various browser-based applications such as Yahoo Mail and Gmail, with the appropriate user interface for reading and writing emails. Another common software agent is Mail Submission Agent (MSA), which may authenticate the user and start the transmission of email message by submitting it to the local or sending mail server. Another one is Mail Transfer Agent (MTA), which transmits the message across the network. Still another software agent is, Mail Delivery Agent (MDA), which delivers the message to its destination mail box, via protocols such as POP (Post Office Protocol) and IMAP (Internet Mail Access Protocol). Other network protocols such as HTTP (Hyper Text Transfer Protocol) may be used in the process when browsers are used for email access. It is understood that some of these functions and modules may be integrated or separated based on various design criteria and constraints. For example, authentication may be done by MUA or MSA, a combination of the two, or another auxiliary module.

A mailbox may be a logical or virtual construct, as opposed to a physical or dedicated facility. For example, a mailbox may be composed of a combination of various storage, like a file or database record, access permissions, and an email address, that when integrated together are seen by the user as a virtual mailbox (an email application UI) containing messages, similar in basic operation and usage to a physical mailbox for paper mail.

In various embodiments, with continued reference to FIG. 3, a networked-based email system includes a number of mail servers 304, 312, and 314, each serving a number of client machines/devices such as user devices associated with mailboxes 306 and 316. The client devices may be any of those shown in FIG. 1 and configured similar to the computing device of FIG. 2. The client devices, using a local email application running on the client machine, such as Microsoft Outlook or other similar standalone application, or a browser-based email software application such as Yahoo Mail or Gmail, connects with a pre-assigned mailbox served by a mail server. The message-associated IDs mentioned above and further described below are generally issued and managed by the mail servers and/or by the client email programs or software applications.

In various embodiments, the various ID's are stored as part of the emails or messages that are received by a recipient, in the same file or software packet containing email message contents. Those skilled in the art will appreciate that email servers, such as Microsoft Exchange, may allow making API (Application Programming Interface) calls to specifically ask for those fields in the message that contain a desired ID, such as the CID or IMI. So, if an email message is stored in a file on a local computer, then these IDs, some or all of them, may be stored as part of the email file. In some embodiments, one or more of these IDs are generated by the email server as they are created, packaged, and transmitted over the network 302.

One of the IDs associated with a message is CID (Conversation ID). Each email server, such as Exchange or Gmail, may use their own internal CID that allows for email clients to easily combine together existing messages into one conversation. The CID is local to a mail server and is assigned per mailbox or corresponding user and per conversation. CID does not travel (transmitted) with the message across servers and network and is managed and used locally on the email server. CID for a mailbox and conversation may be obtained by making an API call to the mail server.

Another one of the IDs associated with a message is IMI (Internet Message ID). When an email is first created by a client (or on a client device), the mail server assigns a unique IMI to it. This IMI is globally unique per email message (in the entire world). Unlike the CID, the IMI does travel with the message and is contained in the body of the message. Hence, the IMI for email message remains unchanged across the mailboxes to which the email message is delivered. So, all users receiving copies of the same email message will have the same IMI associated with the specific message.

An additional ID associated with the message in an email conversation is PMI (Parent Message ID). As a conversation over email starts, the IMI of the initial message is designated and used as the PMI by the email client software for the initial message, which allows the identification of the initial message as a parent message in a parent-child relationship with a reply message to the initial message. PMI is similar to the IMI in type and format. PMI also travels with the email and is the same on all mailboxes. UEP client running on a client device, like other email clients, designates a PMI for an email message created in reply to the initial message.

Another set of identifying data is embodied in Quotations. Quotations are the strings of email messages within an email conversation that show, usually below a received message, the history of the email conversation. The last message included in the Quotation, apart from the current message being received, is the Parent Message and includes the corresponding PMI as well as the IMI of the current message.

In various embodiments the UEP may break down an email conversation into a new communication construct called a thread and assigns a TID (Thread ID) to it. Unlike other existing email solutions, UEP examines all participants in a conversation and breaks down the conversation into threads based on the participants. For example, an email conversation may start with participants A, B, C, and D. This set of participants define one thread in one conversation. In this example, if A sends a reply only to B, that will create a second thread under the same conversation based on participants A and B only. So, at this point, the conversation has two threads, one defined based on participants A, B, C, and D, and one based on participants A and B. UEP assigns its own TID to each of these two threads, for example, TID1 and TID2, respectively.

Another list of information usable to manage a conversation is Reference. A Reference is a list of IMIs corresponding to messages and replies back and forth including PMIs corresponding to or designated as IDs for a current message's parent, parent's parent, and so forth. A Reference shows all history of IMI for emails. While reference is useful to allow breaking down email quotations by their historical IMI, it is an optional resource that frequently is not used. However, when it exists, it travels with a message over the internet and is contained in the body of an email message.

In various embodiments, the construction of a conversation from multiple discrete but related emails may be performed by the UEP in two phases: in Phase I, build a local virtual single conversation from multiple related emails on each mailbox associated with some mail server. This way, a virtual conversation is created from email messages that are part of the same email exchange, which is associated with and is local to a single mailbox. And in Phase II, link the local virtual conversations or communication thread, all of which are part of the same email exchange among various participants, across multiple mail servers and corresponding mailboxes to create a virtual single conversation across all mailboxes regardless of which mail server they are associated with. These phases are further described below. Architecturally, the UEP may be considered as a messaging server that is coupled with or sits on top (in the context of a layered software architecture) of an email server, such as Microsoft Exchange or Gmail servers, and performs various messaging operations described herein.

In various embodiments, the UEP messaging server may include a database (or a database entry in a general database) per user or mailbox in which virtual user mailboxes are created to contain the data related to the underlying mailbox, user information, messages, contacts, and other email-related information for each mailbox. The databases (or database entries) representing the mailbox constitute a virtual mailbox in addition to the user's original or actual mailbox provided by a hosting mail server, such as Microsoft Exchange or Gmail. The UEP uses these virtual mailboxes to link the messages together to create a virtual conversation.

In various embodiments, in Phase I of construction of a virtual single conversation, UEP may retrieve existing messages from a user's mailbox associated with a mail server, such as Microsoft Exchange or Google Gmail (or other email service) by their respective CIDs. As noted above, the CIDs vary by mailbox, where each mailbox is assigned a different CID by its mail server for each conversation. So, even on the same mail server, the same conversation may be assigned a different conversation ID for different users A and B. This way emails may be grouped together based on CID for each mailbox. Emails may be considered to be part of the same email exchange or conversation based on whether a given email, other than the first one that starts the email exchange or interaction, is a reply to another previous email. A second email that is a response to a first email can be grouped with the first email to define an email session, exchange, or interaction. Other emails that are related to these two emails, whether they are responses to these first and second emails, or these first and second emails are responses to the other emails, may be considered as part of the same email interaction or session. A virtual conversation can then be constructed from such sessions, as described herein. Using a generational metaphor, the first email is a parent and the second (sent in response to first email) email is a child of the first email. A session includes all related family members such as parent, grandparent, children, grandchildren, cousins, uncles, and so on.

Once all emails grouped together this way, UEP may start looking for missing emails in a conversation. The missing emails may be those that are deleted by the user or otherwise destroyed, creating message gaps in replies back and forth between two or more users. In Phase I, the UEP may first examine the References as a first step to help break down or decompose the Quotation into its original messages. If no Reference is available to help with the operation of decomposing the Quotation, then the UEP may parse the email Quotations and assign a unique hash code to each message and compare with existing messages retrieved. UEP creates a unique hash function that takes into consideration the number of letters, words and sentences to ensure it is completely unique.

Those skilled in the art will appreciate that parsing is the operation of identifying or matching a component within a set according to predefined rules. Parsing is often used to decompose sentences in a language using the grammar and/or syntax of that language, be it a natural language or a synthetic computer language. A hash function is used to generate a hash code for mapping given data to the hash code. The hash code so generated may later be used for identifying or matching members of large sets, such as tables of various data. A hash code is generated using a hash function. The general concepts of parsing and hash code assignment is known to those of ordinary skill in the industry.

When UEP finds missing messages, it uses them to complete the virtual single conversation being constructed to include all messages that were originally in the email exchange session. Various email messages may become missing from a mailbox if a user in the email exchange deletes it from his mailbox, but other users in the conversation do not. This way the collection of all mailboxes involved in the conversation will likely (but not necessarily) have all email messages exchanged, even if some mailboxes are missing some of the messages. Hence UEP can build up and potentially complete the conversation by examining all mailboxes involved in the conversation. Existing mail servers or platforms, such as Gmail and Microsoft Exchange do not use parsing for similar operations operation.

At the end of the process in Phase I and finding and constructing a local virtual conversation from all component messages, UEP creates a conversation object representing the virtual single conversation, that includes all the messages in the conversation, and assuming that at the very least the last email in the conversation includes the full quotation. The conversation object may be implemented as a software object including data and functions or operations that define the virtual conversation in software. Those skilled in the art would be familiar with object-oriented languages, such as C++ and Java, that allow definition of various software objects to represent other entities using data and operations. Alternatively, the conversation object may be created and managed in a database, where all its member messages and other related information are associated with it within the databased. A combination of both programming constructs and database may also be used to save and load data during program execution (such as a conversation UI) and to save data persistently even if the program is not running. The conversation object is identified by a unique ID designated as Conversation Unique ID (CUID). Once a CUID is assigned to the conversation object, UEP may apply a threading operation, which splits the virtual conversation into sub-conversations called threads, each thread having specific permissions assigned usually based on the users involved in the sub-conversation thread. Threading is further described herein at least with respect to FIGS. 9-10C.

Each thread may be assigned a unique ID designated Thread Unique ID (TUID). Each thread is associated with both the CUID and the TUID. This way UEP can manage a single thread and know to which specific conversation it belongs. Management of a thread includes allowing the users with the appropriate permissions to view it, graphical display of thread metadata, display of thread contents in appropriate sequential order (for example, chronological order, priority order, user-based order, and the like) with respect to the whole conversation or other threads, integration with other threads, and any other thread-related operation that may need proper thread identification.

In various embodiments, in Phase II, the UEP links the same email exchange or corresponding local virtual conversation, identified in Phase I, across multiple mailboxes and mail servers to create a global virtual single conversation. This way the scope of the global virtual single conversation is expanded to cover the whole span of users associated with remote mail servers and mail boxes. The CUID is used to identify the global virtual single conversation. Existing mail servers or email platforms do not perform this function. The steps described above in Phase I are in turn applied to multiple other mail servers and mailboxes involved in the email exchange. This way, a new local virtual conversation is created associated with each mailbox. When at least two UEP clients are part of the email exchange, the UEP performs further functions to complete Phase II. These functions include searching for similar messages across mailboxes associated with local and remote mail servers across the network using IMI, since, as mentioned earlier, the IMI for each email message remains unchanged as email traverses the network to other mailboxes. When UEP finds the particular IMIs it is searching for, the corresponding messages are linked together in the multiple separate local conversations associated with each of the UEP client mailboxes involved and assigns the same CUID as well as TUID (when and if applicable,) to form a global virtual single conversation across all mail servers and mailboxes participating in the email exchange or conversation.

In various embodiments, when the global virtual single conversation object is created, UEP can offer additional services not possible prior to having a virtual single conversation across all mail servers and mailboxes participating in the conversation. These services can be offered because all users involved are placed together in one virtual environment, as opposed to managing copies of emails that are not aware of other copies. This allows UEP to create real time notifications, typing notifications, manage a single version of attachments and more functions as further described below.

In various embodiments, as an illustrative example, a user, user11, associated with mailbox 1-1 (mail server 1, mail box 1), referenced as 306 in FIG. 3, may initiate a simple email message 310 (also designated as M1) intended for two other users, user21 associated with mailbox 2-1 (mail server 2, mailbox 1), referenced as 316, and user2P associated with mailbox 2-P, the message having a content such as "Hello Team." Initially, user11 sends the email to user21 and user2P. Each user receives a copy of the email that is not aware of the existence of the other copies. The email message is assigned an IMI that is unique, such as IMI-123 in this example. If user2P replies to all other participant by saying "Hi there," a new IMI is created for his reply message, such as IMI-124. The reply message will also include the IMI-123 or the original or parent IMI (using a family/generational metaphor) as embedded data. This allows email clients to know that IMI-124 is a reply to and child of IMI-123.

Additionally, mail servers may assign a CID to every email message that is part of the same conversation, so software applications or apps like Outlook or Gmail know how to group or merge them together and present them as a group of related emails to the user in the UI. This presentation is sometimes called a conversation view. As indicated above, the CID is different for each user (or mailbox), even on the same conversation. So users 11, 21, and 2P, who are part of the same email exchange or conversation, each get a different CID. UEP uses this infrastructure that is part of the standard email system and protocols to create virtual conversations that in turn allow it to offer services that were not possible before.

When a user, such as user11, acquires a UEP email account (and becomes a UEP client), all of user11 emails from his inbox are extracted (that is, identified and copied) by UEP and merged into various virtual conversations by using the CIDs provided by the email server. The UEP will also leave all the extracted messaged in the user's mailbox so they can be used by other email interfaces. Extraction of messages does not remove them from the user's inbox. UEP groups the extracted emails and formats the virtual conversations to make a conversation thread look to the user like a forum-style conversation. When a second user, such as user21 signs in to a UEP-based service provider for the first time, UEP does the same thing, creating virtual conversations out of the various messages in user21's inbox. At this point, Phase II of building a virtual single conversation starts. The next step that UEP takes is to search its database for information related to other user's inboxes to ascertain whether emails pertaining to the same conversation exist in someone else's inbox. UEP may use the IMIs to find a least one matching email message in the database. Sometimes some emails are deleted by some of the users in the same email exchange, hence, UEP needs to find at least one match of one item to know how to link two conversations from different mailboxes and mail servers. Because messages contain both their own IMI and the parent IMI, even in a case where the parent was deleted from a user's inbox, by using the parent IMI (or PMI), the UEP can still link the message to another message. In some cases, if necessary, hash codes from the Quotations may be used to find and link conversations. Once UEP links conversations from multiple users into a virtual single conversation, email messages become aware of one another, by being part of the same conversation, in UEP system and this awareness can be used this to create new features for users.

Some of the enabled features include typing notification in which participants in the virtual single conversation are notified in real time about another participant who is presently typing a message before the message is sent. This is similar to applications like Apple's iMessage or WhatsApp software programs. Also presence information about all the users currently participating in the virtual conversation is shown to other participant. Another feature is dynamic version management in which a single version of the attachments, such as files, is maintained and made accessible to all participants. The version management feature is further described below. These and other features are enabled because of having a single conversation where all participants converse in a common virtual space instead of each user having his own copy of the emails sent back and forth, where each email is decoupled from and unaware of other copies of itself. Decoupled copies of emails allow multiple versions of the same attachments and since they are static in nature (i.e., once an email is sent it does not change) no updates or notification about presence information can be accommodated.

Another enabled feature is attachment versioning or dynamic version updating in which when a first user attaches a binary file, such as a Word document, and sends it, and a second user uploads a revised version of the same file, UEP may determine that the file is updated by the second user and may apply the changes to replace the first version with the second version. In essence, this feature mimics the scenario of the two users collaborating or working on the same file at the same time. This allows UEP to manage permissions and know who is actually currently on the thread. This innovation tackles one of the biggest challenges of email when it comes to collaboration. While collaboration means multiple people come together to a single place to converse, email creates the opposite effect by having message copies that are not aware of one another. For this reason, companies, other enterprises, and governmental organizations often buy dedicated collaboration systems that are not email-based to create a common virtual environment for multiple people to join and be synchronized in their work, or be "on the same page" while collaborating. By creating this virtual single conversation UEP enables email systems to be used for real time collaboration and make it as powerful and useful as dedicated collaboration solutions while maintaining compatibility with non UEP email users.

Figure 4A:
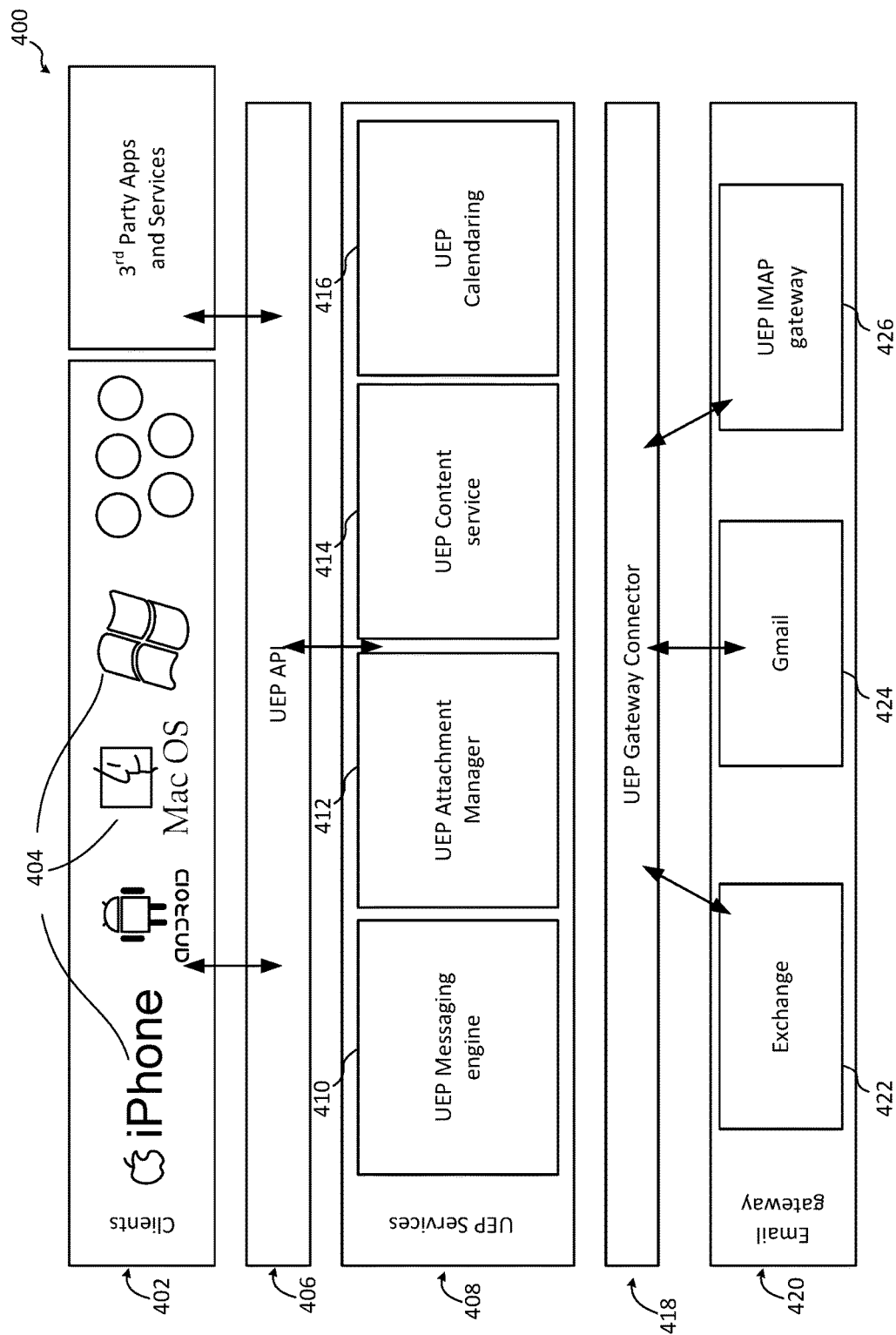
FIG. 4A shows an example software and/or hardware computing structure usable in the email communication environment of FIG. 3.

FIG. 4A shows an example software and/or hardware computing structure usable in the email communication environment of FIG. 3. In various embodiments, computing structure or stack 400 has a number of layers including clients layer 402 having various clients 404 such as mobile clients like iPhone™, Android™, and other clients like Mac OS™ Windows™, and other third party applications and services. Adjacent to client layer is the UEP API layer 406, itself being adjacent to UDP services layer 408 including UEP messaging engine 410, EUP attachment manager 412, UEP content service 414, and UEP calendaring service 416. The next layer is the UEP gateway connector layer 418 connecting services layer 408 to the communication and/or email gateway layer 420 having various communications and/or email gateways such as Exchange 422, Gmail 424, UEP IMAP gateway 426 among others.

In various embodiments, software structure 400 is organized to create a data pathway that is usable to transfer data in a compatible manner from a client level application 402 to a gateway level 420. This software structure may be viewed as a communication stack with middle layers that function as data adapters between other layers. For example, email data arriving from the network stack is passed through the Exchange gateway 422 to UEP gateway connector 418, then passed onto UEP services 408 to manage and manipulate the incoming data according to the requirements of higher level applications, then passed onto UEP API layer 406, which provides an interface to the clients layer 402 where various applications for different platforms receive the data to display to the user.

Those skilled in the art will appreciate that in a software stack, such as a communication stack like the ISO-OSI (International Standards Organization—Open System Interconnect) standard model, adjacent horizontal layers present standard interfaces to each other for communications and each layer has its own functions that is transparent to the other layers. The interfaces usually take the form of a set of software functions, like API, that the other layers can call programmatically to pass on their data. The purpose of such stacks may be divided into two major categories: one purpose is providing high-level abstractions at the client application layer (high level) that hide lower level details of data such as information packet formats and the like, and the other purpose is to function as an adapter to connect one or several data sources to several or one data consumers with diverse and incompatible data formats. For example, with continued reference to FIG. 4A, data arriving at Gmail 424 may have different format and requirements than data going through Exchange 422, but both pass through the UEP gateway connector layer 418, using the same interface. This way, the UEP gateway adapts and hides the data sources Gmail and Exchange to look like the same data to higher layers. The same thing happens between UEP service layer 408 and client layer 402, where UEP API hides the differences between the different clients, so all the clients can use the various UEP services 408 through the UEP API. The UEP gateway layer also allows the importing of the data associated with email messages sent through the various email services and brings them into the UEP core messaging engine 410. From that moment on, UEP system handles the message, route it to the right person inside the UEP application and back out if needed.

In various embodiments, each client device, such as those shown in FIG. 1, which is a party to the communication may include some or all of the stack 400 layers shown in FIG. 4A to seamlessly transmit, receive, and handle the data communications between diverse email platforms and clients. Similarly, a UEP messaging server, described below with respect to FIGS. 6 and 7, is similar to the server computing devices of FIG. 1 and may also include part or all of the stack 400.

In various embodiments, the UEP system, which includes UEP email clients and UEP messaging server, further described below with respect to FIGS. 6 and 7, and each of the boxes shown in FIG. 4A may be implemented by one or more software modules that when executed on a processor cause the processor to perform the functions described above. For example, the UEP API may be implemented using at least one or more server run time component" which could be a DLLs (Dynamic Link Library) or the equivalent Java or other technology stack that are bound and called during runtime on a running hardware computing system to perform the functions it is designed for, such as changing data formats, implementing communication protocols, handling session timing, handling security services like encryption and decryption, and the like. Each of these functions may be performed by one or more software modules or components. Similarly, UEP Messaging Engine 410, Attachment Manager 412, Content Service 414, Calendaring 416, Gate Connector 418, each may have one or more designated software component, such as Messaging Engine software module, Attachment Manager software module, Content Service software module, Calendaring software module, and Gate Connector software module. Those skilled in the art will appreciate that other peripheral services and utility functions and modules may be included as part of the UEP system.

UEP uses cloud computing environment to provide access to the email from any place or device, to easily connect and interact with existing email platforms, to perform real time communications and other functions as described herein.

Figure 4B:
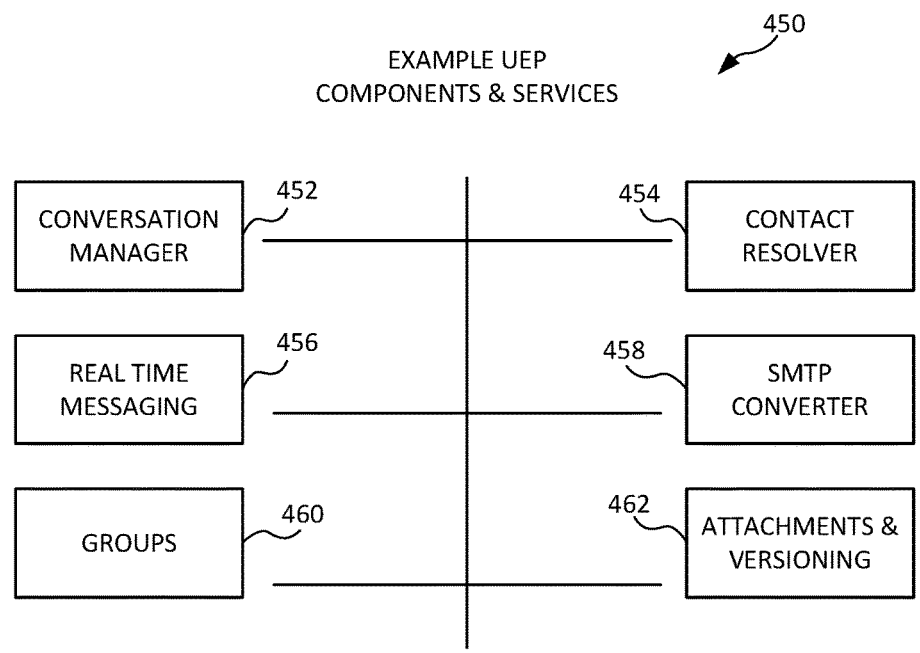
FIG. 4B shows example Universal Email Platform (UEP) components and services related to email messages.

FIG. 4B shows example Universal Email Platform (UEP) components and services related to email messages. In various embodiments, components and services 450 include conversation manager 452, contact resolver 454, real time messaging 456, SMTP (Simple Mail Transport Protocol) converter 458, UEP groups 460, and attachments and versioning 462.

In various embodiments, each of the above mentioned components and services may include both one or more components to implement one or more services. For example, one or more software modules may be used to implement the conversation manager and its services in integrating and creating a conversation from discrete but related email messages. Those skilled in the art will appreciate that one or more of the services may be implemented by one or more system components and modules.

In various embodiments, conversation manager software module 452 may cause the computing device on which it runs to carry out all or some of Phase I and Phase II operations for constructing a virtual single conversation described above with respect to FIG. 3. The conversation manager module may a part of the UEP platform, such as the UEP messaging engine 410 and/or UEP content service 414, described with respect to FIG. 4A. In some embodiments, it may a separate module that communicates with one or modules depicted in FIG. 4A. In communication and collaboration with other UEP modules, the conversation module may collect the needed data, such as the various IDs like IMI, PMI, CID, TID and the like, from emails passing through the UEP platform and software stack shown in FIG. 4A. The conversation manager may then use these and other data to construct the virtual single conversation. The conversation manager generally manages UEP conversations, including their storage, update, permissions, and the like. It also identifies UEP conversation objects and also manages threading and related permissions (who can participate in a particular thread.) Conversation manager is further described with respect to FIG. 6B below.

In various embodiments, contact resolver module 454 identifies UEP-based vs. other non-UEP mail servers and users to know what services it can provide for each and how to handle their emails. These are further described in FIGS. 5-7. The contact resolver also identifies group membership and special users. Groups are further described with respect to FIG. 8B.

In various embodiments, real time messaging software module 456 includes a real time software engine for UEP to UEP mailbox conversations. It may provide services such as typing notifications, real time update of each user's screen as other users type in more comments, and the like. The real time messaging module handles various push notifications, in which data are sent to a client from a server without the client having requested it first. Push notifications may include users joining or leaving a conversation among other types of information. The real time messaging module also manages information related to user presence in a conversation, such as providing information about the presence of a user to other users, location identifier for the user, permission levels granted to the user, and the like.

In various embodiments, SMTP converter module 458 may parse Quotations associated with emails to extract various IDs, discussed above with respect to FIG. 3, and relate emails together. It may also convert entails from a discrete view as shown in common email interfaces to conversation view, in which multiple emails are shown as embodied in one virtual conversation, as described herein. The SMTP converter module may further be a contact extractor used to obtain contact information associated with emails. It may further be a data detector used for various custom actions.

In various embodiments, groups software module 460 may identify groups created by other email platforms and mail servers such as Exchange. It may further create a group conversation archive used to store information about virtual conversations between UEP clients based on which group the conversation belongs to. This is further described with respect to FIG. 8B. The groups module may further manage permissions related to groups and their members regarding which conversation threads they have permission to view or participate in.

In various embodiments, attachments and versioning software module 462 may provide version control for binary attachments such as text or slide files, so that if an updated version of the same base file is attached by one user in a conversation, other users in the same conversation will receive the most recent version of the attached file. This module may further provide previews for common file types attached to email messages so a user does not have to fully open an attached file to see its contents. It may further create smart attachment objects within the UEP system. Smart attachment objects may include original attached objects with added functions and facilities for supporting other services provided by UEP within the virtual single conversation such as previews, version updates, and the like. Smart objects provide the ability to attach a mini application (small software with specific functions) into an email, in a similar way to attaching a file. For example, if a user attaches CRM (Customer Relationship Management) opportunity ticket to an email, the ticket may be displayed in a designated area of the UEP UI, such as the top as an active mini application, which when selected may perform a specific task of making a reservation or confirmation or show details of the event for which ticket is provided. Below the mini application in the messaging area, the users can discuss this ticket.

Those skilled in the art will appreciate that the functions described above for each of the above components and services may be performed in collaboration with other software modules. Further several of these modules may be integrated into one module, or one of these modules may be implemented as a collection of smaller and more specific modules.

Figure 5:
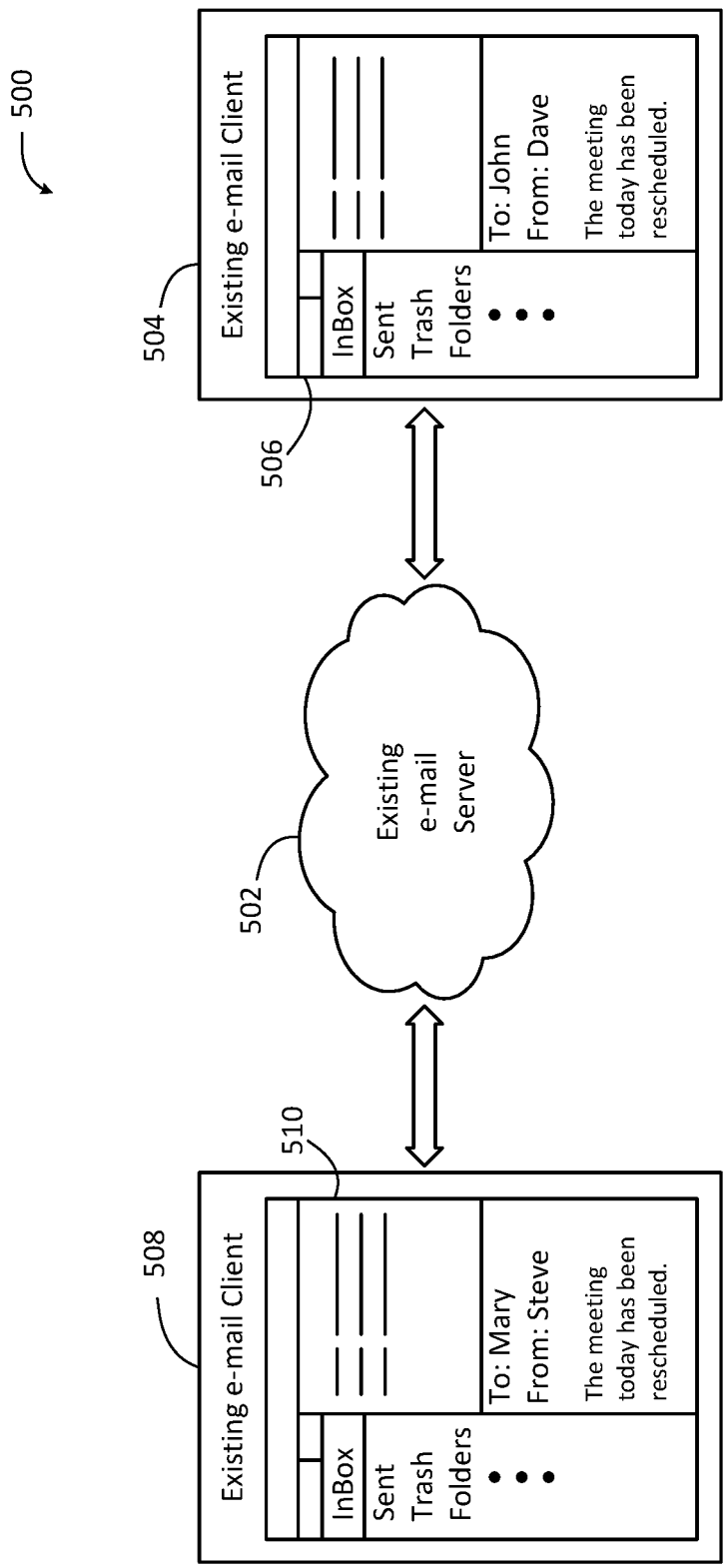
FIG. 5 shows an example communication session between two existing email clients via an existing email platform service.

FIG. 5 shows an example communication session between two existing email clients via an existing email platform service. In various embodiments, communication session 500 includes an existing client device 504 having email application 506 with an appropriate user interface to view email contents, sender, date, subject, attached documents or objects, and other similar information. The first existing client device 504 communicates, via an existing email server 502, with a second existing client device 508 having existing email application 510 with a similar user interface.

In various embodiments, the existing client devices communicate together using an existing model of email communications in which emails are sent and received as discrete packets of high level information usable and readable by a human user. In the general case of existing email communications, the sender uses an email application, such as Microsoft's Outlook/Exchange or a web-based email client like Gmail, to write an email body or desired content in a human language such as English, sometimes attach a document, video, or other software object, write the email address of one or more recipients, write a subject and send the email to the specified recipients. On the other end of the communication, the recipient, using a similar email application program, receives the transmitted email, open it, read it, open any attachments, write a response as another email to sender or the sender and all recipients (reply to all), and send the email in a similar manner. This process may continue by several users involved in the communications until there are no more replies.

The existing email communication model is asynchronous in nature, in which emails are sent as copies to recipients and are stored in their email inbox (like a paper mailbox) until the recipient wants to read it at a different time. In this sense, email is not a real-time communication method as real time generally requires people to be simultaneously on the same "service". Thus, the existing email systems are analogous to paper mail in which envelops and letters are sent to a physical mailbox address, but in electronic/software form. Whereas the UEP model is more analogous to people sitting in the same room and interacting that way in real time. Those skilled in the art will appreciate that many other operations are possible with email such as deleting, storing, marking/flagging (for example, marking urgent, read, spam, etc.), and the like.

Figure 6A:
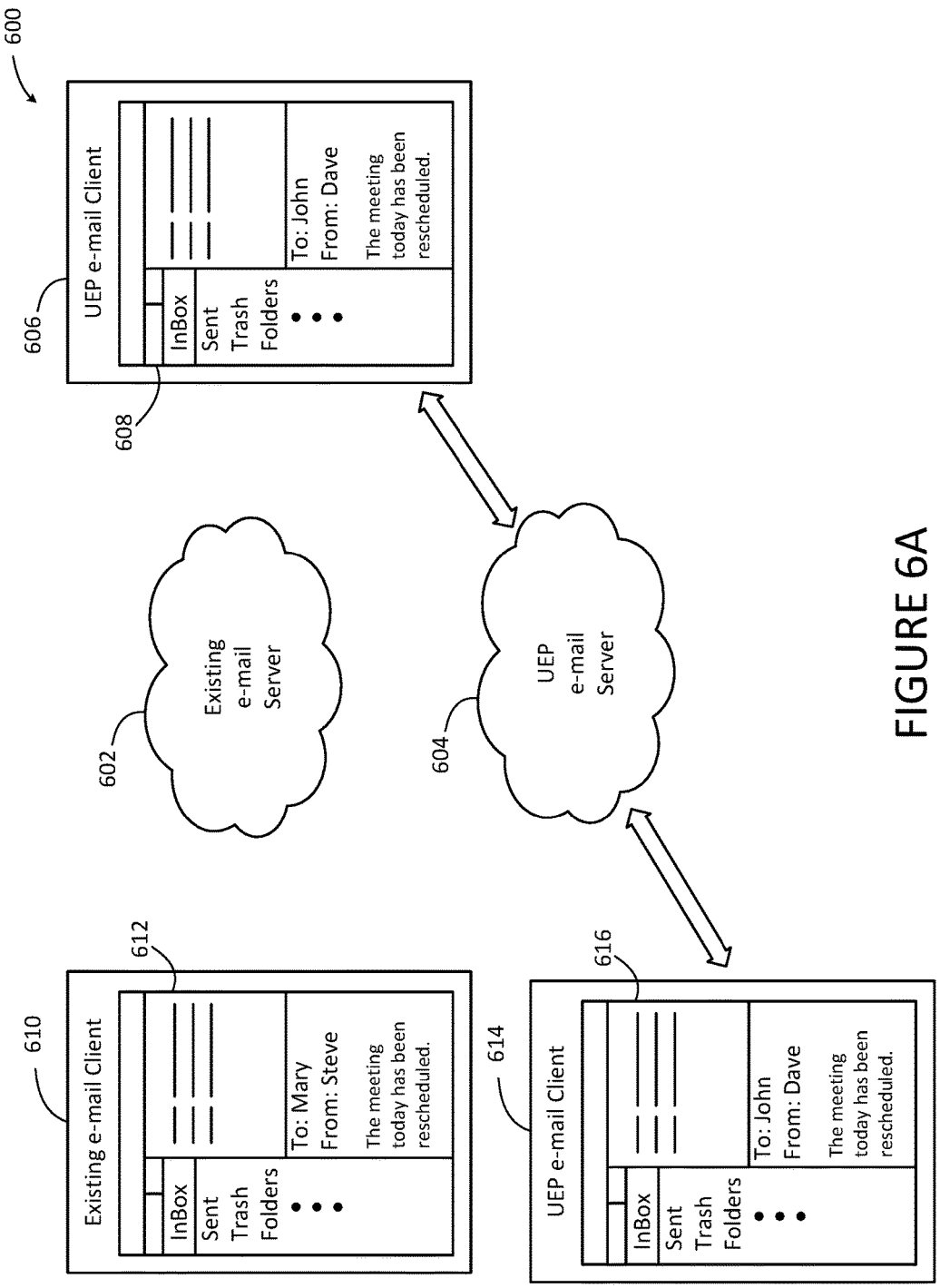
FIG. 6A shows an example communication session between two UEP email clients via a UEP service.
Figure 7:
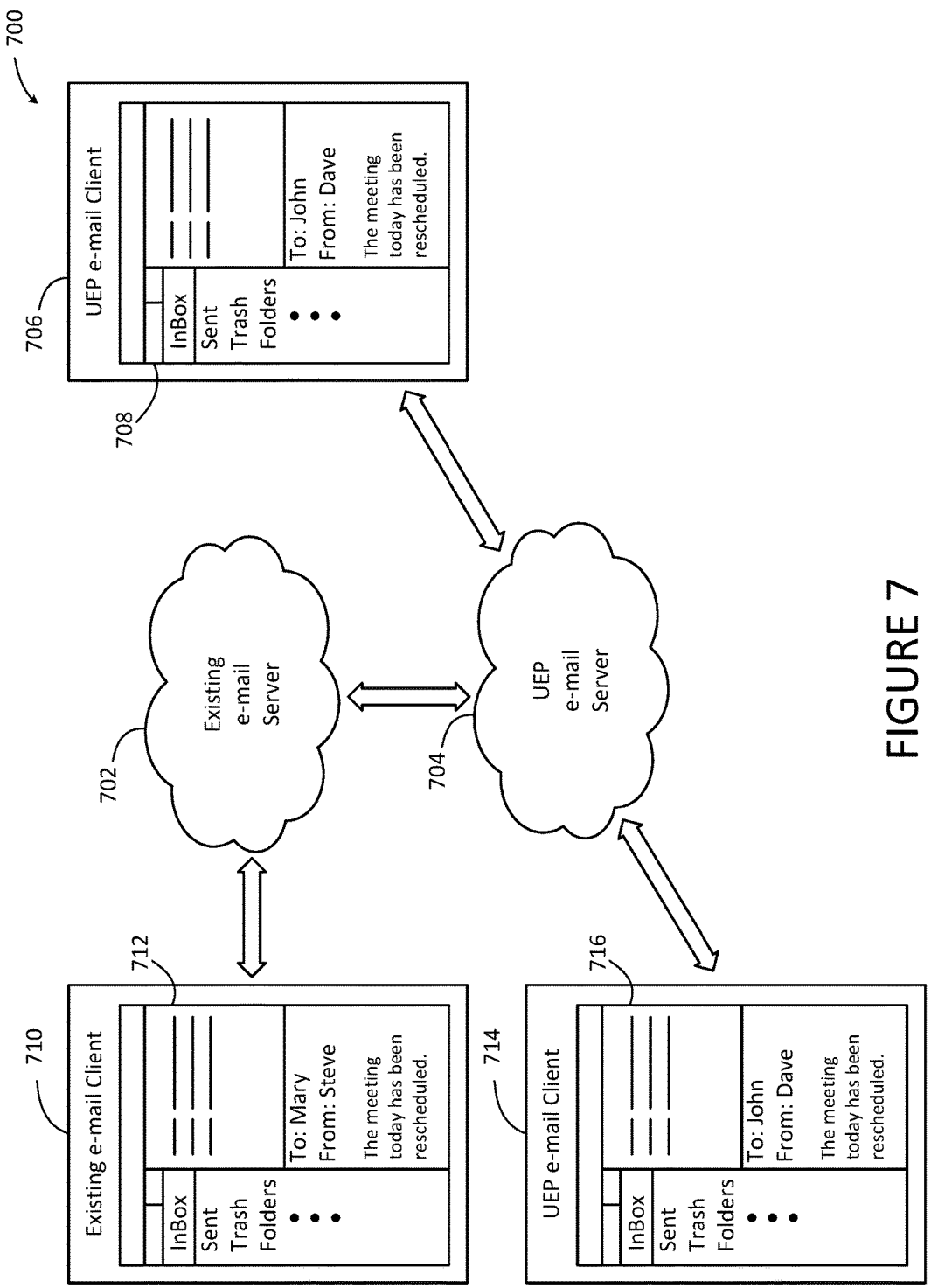
FIG. 7 shows an example communication session between several existing and UEP email clients via a UEP service.

FIG. 6A shows an example communication session between two UEP email clients via a UEP service. In various embodiments, communication session 600 includes a UEP client device 606 having email application 608 with an appropriate user interface to view email contents, sender, date, subject, attached documents or objects, and other similar information. UEP client device 606 communicates, via a UEP email exchange server 604 with another UEP client device 614 having existing email application 616 with a similar user interface. Other existing email servers 602 along with other existing client devices 610 having existing email application 612 may be present in the same communication environment.

In various embodiment, the UEP client devices are similar to client devices described with respect to FIGS. 1 and 2 above, and communicate through the UEP email server 604 in substantially different manners than the existing email platforms described above with respect to FIG. 5. The UEP is a messaging server that is coupled with or sits on top (in the context of a layered software architecture) of an email server, such as Microsoft Exchange or Gmail servers, and performs various messaging operations described herein. However, for ease of reference, both terminologies of "email server" and "messaging server" may be used interchangeably herein, unless explicitly stated otherwise or context makes it clear otherwise. The UEP architecture and design enables interactions between two or more email client devices 606 and 614 in a session to take place in a single conversation object that allows people to join or leave but copies are never sent around. This allows two or more UEP clients to view the conversation as a real-time, continuous stream of communications, in which people may enter an ongoing conversation in the computing cloud and have access to the history or thread of communications prior to their joining the communication session. The layered architecture of FIG. 4A allows UEP to seamlessly communicate through multiple other existing or new email platforms.

The UEP architecture allows asynchronous, like existing email systems, as well as synchronous communications at message or email level between multiple participants depending on whether the other user is on UEP or on a different email system. Synchronous communications allows real-time update of the email thread of all participants without waiting to receive a discrete packet, like existing or traditional emails, containing new information. This aspect of the UEP architecture is similar to instant messaging or online chat between two or more participants where a session is an ongoing series of information exchanges between the participants. This way, when one participant responds to a comment in the stream or attaches a new digital object, such as a file attachment, all other participants receive his comments and attachments in substantially real-time, delayed by any network latency. This communication stream, or UEP email thread, may be saved as a digital file or object, searched for, replied to later, filed under a different email folder, and handled in any other way in a manner similar to an existing asynchronous email. In some embodiments, attachments are managed by creating updated versions of the attachment every time a new version of the attachment is sent. As all UEP users are working on the same thread, the UEP system simply updates the master attachment rather than having multiple copies of different versions of the same attachment.

In various embodiments, each participant may be associated with a permission or access list to allow access to a subset of the communication stream. Based on the permission settings, a user may be restricted with respect to how he can participate in the communication, what portions of the communications he can see, what attachments he can view or download, which participants he can reply to, what portion of the thread he can view as defined by a time range (start time and end time of a portion of the thread), and the like. For example, a participant may be limited to view the main thread, but not any of the sub-threads, as described later with respect to FIGS. 9 and 10. Such permissions may be set and changed by the thread owner, who may be predefined as the person who started the communication thread, or an administrator or manager of communications in a predefined group.

In various embodiments, the cloud-based conversation may be nested or split into one or more sub-threads allowing side conversations to separate from the main thread, as described later in detail with respect to FIGS. 9 and 10.

In some embodiments, filters may be employed to filter email contents based on participants, subject, attachments, and the like. Filters may be related to permissions described above in some embodiments. A user viewing a number of conversations or threads of communications may wish to limit the list of such threads using filters. For example, the user may wish to look at only a range of dates, senders, subject, attachments or attachment types (such as text or pictures,) recipients, and the like. Any of the email parameters, such as the aforementioned ones, may be used as filter parameters when assigned certain values to limit the list of threads. For example, "Sender" is a parameter in an email thread. By assigning a particular value to it like "John Smith," the user may limit the number of such threads to those sent by John Smith.

In other embodiments, a user may search for threads based on various criteria such as date range, sender, receiver, subject, attachments and other parameters. Search may be closely related with the filters discussed above. For example, search for threads may be performed using the same filter facility described above to limit the results of the search to those desired.

In some embodiments, the user may wish to search a thread of conversation like a document to find a portion of the communication contents, such as a sentence, a paragraph, the comments of a particular user in the same thread, contents based on date or time of posting the comments, particular keywords, points of split in the thread, points of nesting in the thread, and the like. For example, a thread of emails or conversations may include five participants, each one replying to others or making new comments. Some of the participants may split the thread while others might carry a side conversation causing a nesting in the thread. The user searching for specific portions of these remarks by other participants may search the thread using the filters described above or other similar user interfaces, such as advanced search dialog boxes. Those skilled in the art will appreciate that many such search interfaces may be used to filter content and search for specific results. The user may specify that he wants to view the main thread only and not be presented with split threads or nested threads. Conversely, he may wish to only view the nested threads.

In various embodiments, filters and search interfaces are similar in that both limit the results that a user is interested in finding or viewing. Filters and/or search dialog boxes are software modules that may include various user interface facilities such as text fields, dropdown boxes, checkboxes, radio buttons, or other similar graphical components that allow the user to select what he wants to search for and to limit what results are displayed. Using each of these graphical components allows a particular type of limitation to be applied to search results and/or data views (a data view is a display of data and information containing particular aspects, arrangements, selections, orders, presentations, or types of information based on user selections.) For example, the user may select or specify particular date ranges, senders, keywords, types, and the like of information he wishes to view or search for. The same underlying user choices may be applied to limit display of data via filtering, or search for data via search criteria.

In various embodiments, filters and search interfaces are not limited to viewing information. They may be used by a user to enter comments at a particular point in the conversation. For example, the user may wish to respond to a particular split thread. In this case, he can first find the split thread and then add his comments in response at that point in the thread.

Figure 6B:
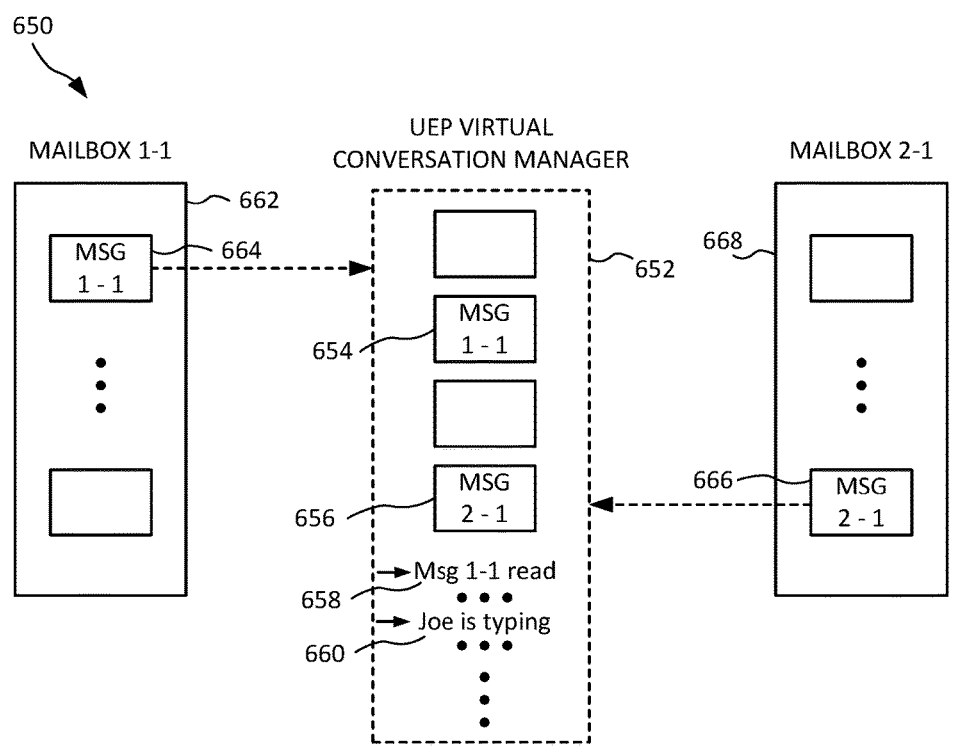
FIG. 6B shows an example UEP virtual conversation manager configured to integrate multiple related discrete emails into one conversation between multiple users.

FIG. 6B shows an example UEP virtual conversation manager configured to integrate multiple related discrete emails into one conversation between multiple users. In various embodiments, the virtual conversation environment 650 includes a first mailbox 662 having messages 664, a second mailbox 668 with various messages 666, both mailboxes in communication with UEP virtual conversation manager. Conversation manager is the same as conversation manager 452 discussed above with respect to FIG. 4B. Conversation manager includes messages 654 corresponding to message 664 and message 656 corresponding to message 666 arranged in a continuous virtual single conversation 652 rather than as discrete messages within mailboxes 662 and 668. The conversation manager further includes notifications to a user about other users' actions such as notification that a previous message has been read 658 and typing notification 660.

In various embodiments, the UEP virtual conversation manager is composed of one or more software modules configured to mainly carry out some or all of Phase I and Phase II of building a virtual single conversation from multiple related emails, as described above with respect to FIG. 3. The conversation module may collect the needed data, such as the various IDs like IMI, PMI, CID, TID and the like, from emails passing through the UEP platform and software stack shown in FIG. 4A. Those skilled in the art will appreciate that the conversation module may work with other components of the UEP platform, such as those in the UEP stack. The conversation manager may use these IDs along with other data to link email messages together and relate them to build the virtual single conversation. The conversation manager may also manage UEP conversations, including their storage, update, permissions, and the like. It may also identify UEP conversation objects and also manages threading and related permissions (who can participate in a particular thread.)

In various embodiment, as an illustrative example, the conversation manager examines email messages, such as message 664 of mailbox11 and message 666 of mailbox21, to identify the above-mentioned IDs and determine, based on one or more of these IDs, if these emails are part of the same email exchange. If so, then the email messages are linked together, where one email can be reached from another by following the software link. Those skilled in the art will appreciate that linking in software can take different forms, such as use of pointers and references in programming languages, use of tables in data structures, and any other connection between two emails via which one email can be reached from another. As emails are linked they are placed within the virtual single conversation 652 showing their relationships with respect to each other and users who sent them. For example, a child email sent in reply to a parent email may be depicted graphically in the virtual conversation as such. Other metadata or related information may also be provided within the virtual conversation in proximity to the message, in a dashboard separately, or available via a context-sensitive menu or dialog box.

In various embodiments, UEP client devices and corresponding users see the email messages in the context of a virtual single conversation 652. They see the same mails but as one continuous stream, rather than discrete messages in their respective mailboxes. This way, all email messages involved in the conversation are part of the same virtual conversation, are linked together, and can be updated as needed in real time and in one place. The same applies to any attachments to the emails. Various versions of the same base document or file attachment may be reviewed, based on timestamp or contents, and the latest version is posted in the virtual conversation accessible by all participants. The virtual single conversation is similar in some respects to a bulletin board visible to all participants. When a new UEP user is added to a virtual conversation, unlike email, the user does not receive a static trail of emails or a Quotation. He simply joins the conversation as if he were part of it from the beginning. This is a significant departure and difference from traditional email and emphasizes the similarity to a real time discussion board or forum style conversation. Whenever a new user joins the conversation, she can respond to any message, even ones that were posted before she joined.

In various embodiments, other information, such as notifications 658 and 660, may also be provided to the virtual conversation participants.

FIG. 7 shows an example communication session between several existing and UEP email clients via a UEP service. In various embodiments, communication session 700 includes a UEP client device 706 having email application 708 with an appropriate user interface to view email contents, sender, date, subject, attached documents or objects, and other similar information. UEP client device 706 communicates, via a UEP email exchange server 704 with another UEP client device 714 having existing email application 716 with a similar user interface. Other existing email servers 702 along with other existing client devices 710 having existing email application 712 may be present in the same communication environment and communicate with the UEP clients via the UEP servers 704 and existing servers 702.

In various embodiments, the UEP client device may first register its associated user email address with the UEP server, after which point the UEP server will recognize and treat the UEP client as such. The UEP server may store email address information in its databases to identify the UEP clients and send them the UEP type of email information that allows them to experience the threaded or stream-based communications described herein. The UEP client devices are similar to client devices described with respect to FIGS. 1 and 2 above, and communicate through the UEP email server 704 in substantially different manners than the existing email platforms described above with respect to FIG. 5. The UEP architecture and design enables interactions between two or more email client devices 706 and 714 in a session to take place as a real-time or non-real-time (stored), continuous stream of communications or messages, in which people may enter an ongoing or previously stored conversation in the computing cloud, get real-time updates on the current thread of conversation and have access to the history or thread of communications prior to their joining the communication session, all subject to any filtering of information that is in effect.

Figure 8A:
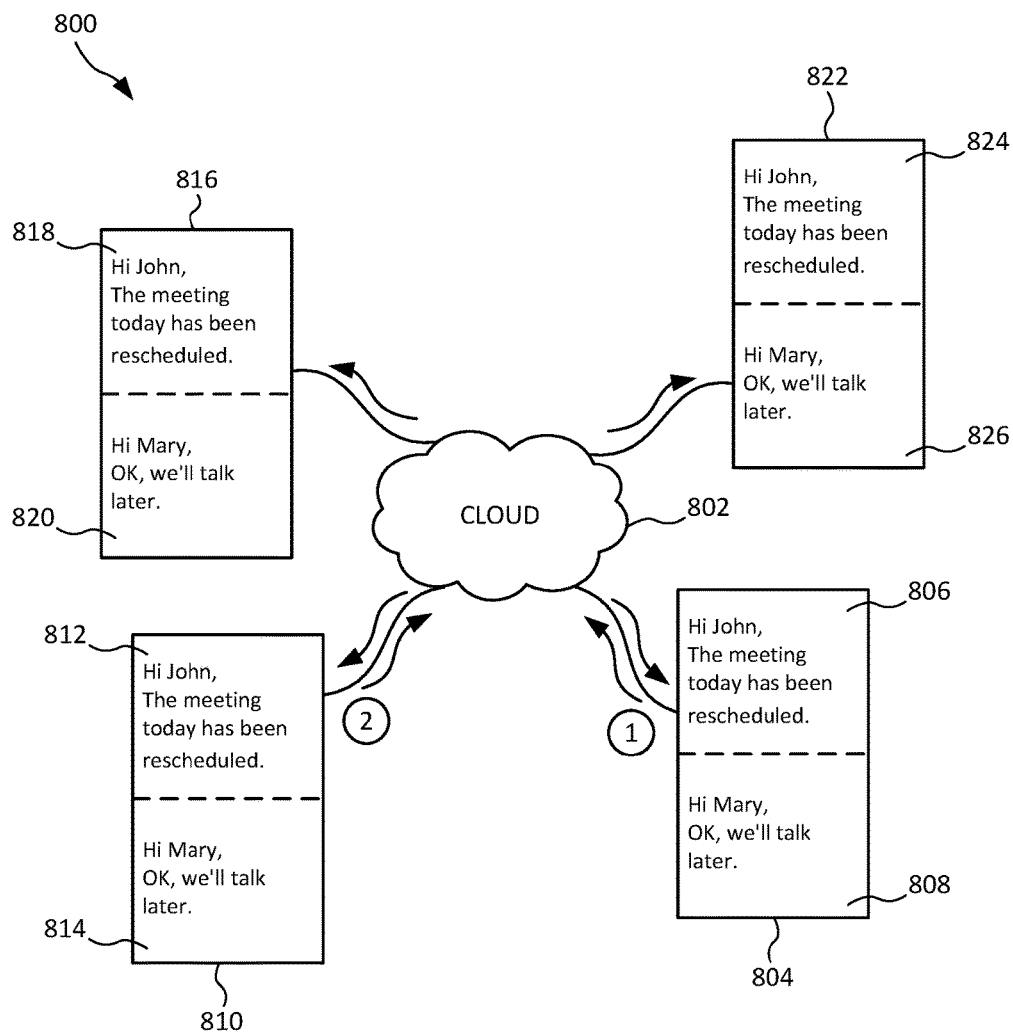
FIG. 8A shows an example data transfer in a communication session.

As further described with respect to FIG. 8A, all messages that are exchanged between UEP clients are synchronized or copied back to their respective traditional mailboxes associated with their non-UEP email servers. This way, the UEP messaging server does not alter the users' existing capabilities, and if they desire they can even reply from their traditional email application and still participate in the conversation.

The UEP architecture allows a "live" (real-time and currently occurring) editable conversation to take place (similar to a chat session with respect to the real-time aspect of communications), in which the thread may be used for effective collaboration. This architecture also allows a non-real time and stored but still stream-based editable conversation by storing a conversation session as a continuous thread that can be searched and edited by the UEP server to add comments and responses at appropriate locations within the stream, after which the users will see the edited communication thread. A UEP email thread is programmatically and systemically one stream of data, usually in the form of messages, that is delimited or partitioned internally by acts of participants who reply to previous comments or make new remarks, attach an object, split the thread, or take other similar actions. The messages also get copied or synchronized after being sent back to the non-UEP email server to maintain parity with the email server. So a user can still use his other email client to participate in the conversation.

The thread may thus be controlled and filtered on the boundaries of such partitions, making each partition similar to a semi-discrete unit of communication like existing packet-based emails. So, a participant can reply to one of these semi-discrete units within the greater continuum of the main thread. It is different from a chat or IMS (Instant Messaging Service) at least in that it provides all email services such as attachments, splitting and nesting threads, persistence after session ends, ability to respond in real-time, or asynchronously respond later like traditional email, editing (by the UEP server) the stream to add responses at random places within the thread, among other differences. Also, unlike chat, the UEP system allows users to respond to a comment that is not the last or latest message in the thread and start nesting and building a threaded ongoing conversation. This way, a receiving user's reply to a previous comment of another sending user may be inserted next to the previous comment in the middle of the thread, thus editing (by the UEP system, not directly by a user) the existing thread. Additionally, unlike other IMS, in some embodiments, UEP may use standard email addresses, which do not necessitate any custom new profile or user account to be created, consistent with the fundamentals of the UEP architecture.

In contrast to the UEP email system, in the existing or different email systems communications are based on disjoint units as individual electronic mail messages, in which once an email message is sent its contents cannot be filtered for later visibility, updated, or otherwise modified. Any thread of conversation in existing emails is a thread, or rather a sequence, of disjoint and static messages or packets. No contents are updated or filtered, and no new participant can be joined once a particular email is sent. A new participant can only join such static conversation by being copied later by one of the senders in another later email disjoint from all other email messages before it. And unless the email trail is copied within the later email message, the new participant cannot see the history of the conversation. Additionally, the traditional/existing email messages in a conversation are only loosely connected via subject matter and/or senders and receivers, and such loose connections only exist or are only visible to those participants who are copied on the emails, not to any subsequent participants who were not initially or earlier copied. Otherwise, there is nothing that programmatically or systematically binds one email message to the next.

The UEP architecture allows asynchronous, like existing email systems, as well as synchronous communications at email message level between multiple participants. In various embodiments, a participant in an email communication thread may send and receive emails to both other UEP participants and existing email services participants associated with client device 710. The UEP email server is configured to send and receive messages from existing email clients through existing third-party email servers 702, such as Microsoft Exchange™ and others, in a manner that is transparent to both types of participants. The UEP client receives and views emails through his own email interface, while the existing email client receives and handle his messages through the traditional email interfaces and ways of handling.

This seamless communication is made possible by the system architecture of UEP shown in FIG. 4A above. In effect, UEP system creates a single place where the conversation and interaction between users takes place. Additionally, in some embodiments, in a mixed conversation where some people are on UEP and others on standard (non-UEP)

email, the UEP system provides a technique to merge the standard or traditional email back into the threaded UEP conversation and keep updating that thread with latest contents from traditional emails. This is done by applying text merging analysis. So, the UEP system (server-side software modules, client-side software modules, or a combination of both) examines the text, metadata, various IDs discussed above (e.g., IMI, PMI, CID, etc.), and/or other content that come from the email, looks at the entire email history of text and other content in the UEP thread and based on these data determines where to merge the contents of the traditional email into the UEP conversation thread. This way an existing thread can be modified by the UEP system including modifying the portions of the thread that have already been sent/received/posted previously (that is, not just continuing with and adding new conversation to the end of the thread).

UEP may use the same email content examination technique to sync back messages between a UEP user's UEP mailbox and his traditional non-UEP mailbox. As a result, a UEP user can switch back to his other traditional email client and continue the conversation from there in the same manner a non UEP participates in a mixed environment. UEP may further use a method that for every message created by a user on UEP, an equivalent one is created by UEP and copied back to the non-UEP mailbox. The effect may be the same as sending an email to the non-UEP mailbox. This way the UEP and the non-UEP mailbox of a user are synchronized and remain consistent with regard to email messages at all times. To maintain real time operation, UEP may first send the message to the UEP mailbox and then create the same message in non-UEP mailbox, for example, a Microsoft Exchange mailbox.

In various embodiments, the UEP server 704 allows the use of a single email platform for UEP email users to communicate with other UEP email users as well as with the email users of any other email platform. For communication with UEP users, the UEP server provides additional advantages of a live email stream, as further described below, while for communication with other email users, it supports the protocols and standards of the basic email services with the exception of being able to merge back replies into the UEP threaded conversation object. In various embodiments, on the non-UEP side, the UEP messaging server may deliver packetized, discrete email messages to non-UEP platforms and their users, while on the UEP side, it may deliver and manage the same email messages as live streams of communications. This way, each user operates in his own familiar email environment and gets the type of email messages he is used to. This operation is performed by the UEP platform automatically without the need to switch over or change any settings and, is thus, transparent to the users. The UEP messaging server may merge the non UEP emails so that a UEP client/user can still consume conversations in a threaded, ongoing way but without the real-time aspects, when communicating with existing non-UEP email user.

In various embodiments, the UEP server may be configured to transmit all or a portion of a live messaging or conversation stream upon request from a user (a sender or receiver of emails). The server may separate or select a subset of a thread, which may also be a split thread or a nested thread, and send the selected portion to the requester. The selection may be based on search, filter, or permission settings. A UEP client may receive such portion as a live stream consistent with its UEP configuration, while a client of an existing email platform may receive it as a discrete email message like regular or traditional email messages. For example, a user may be searching for an email in his inbox from a particular sender or on a particular subject, but he may also have limited permissions for viewing the thread and/or its attachments. The UEP server and/or the UEP client, singly or in collaboration with each other depending on implementation, will find and send only the portions of the thread he was searching for subject to any permission limitations. The selected portion may be packaged and sent to the client of existing email platforms as a discrete email message, while it may be sent to the UEP client as a filtered stream of messages to a restricted participant.

In summary, in some embodiments, for communications between UEP clients, the UEP system may use their existing email addresses as the unique user ID. So, a UEP user can send a message to any email address. If the other side is also a UEP client, then he is identified as a UEP client and the UEP communication thread is created and used (if part of an existing thread) instead of sending copies of an email. The UEP system can mix and match communication and/or email messages in the format appropriate for each client. That is, for non-UEP client discrete email message copies are transmitted, while for UEP clients the UEP communication thread is made available. The UEP can, as an option, synchronize all UEP conversations back to traditional format to the underlying email server (e.g., Exchange, Gmail, etc.) in case user decides she wants to switch back and forth between UEP and non-UEP environments or UI.

This process is repeated back and forth between diverse clients, each based on its own email platform capabilities and requirements, to send and receive messages. As a result, non-UEP clients continues to receive the same messaging/email service as before without degradation, while UEP clients receive enhanced services, as described herein.

FIG. 8A shows an example data transfer in a communication session. In various embodiments, communication session 800 may include a number of participants 804, 810, 816, and 822, each having copies of the same updated conversation taking place between the participants via cloud 802. The conversations may include remarks and replies from various participants in the form of partitions delimited by header information such as sender, recipients, subject, date, IP address, and the like. The partitions are shown as sections 806, 808, 812, 814, 818, 820, 824, and 826 for participants 804, 810, 816, and 822, respectively.

In various embodiments, in operation, initially, participant 804 may make a comment in section 806, which is sent to all recipients and received as sections 812, 818, and 824. Another participant 810 may reply next in his section 814, which is then received by other participants in sections 804, 820, and 826. As further clarified and described herein, the terms "send" and "receive" does not refer to copying and sending/receiving of the new copies of the email threads to/by recipients. Rather, it refers to sending of viewing information so the same single central thread or data stream document can be viewed by multiple users. This way, there is one master or central copy of the threaded communication maintained by the UEP server, while the UEP users and standard email users can view and add to the central thread through the UEP server. Users cannot directly modify or edit the central thread, which is subject to the UEP server control, permissions, safeguards, filters, and the like. Cloud 802 may include both UEP messaging server and existing email servers, as shown in FIG. 7. In this conversation, the participants who are using UEP email clients see a continuous stream of conversation updated on their screens in real-time and have access to all the UEP features, such as search and filtering, described above with respect to FIGS.

6 and 7. The participants who may be using existing email clients will experience the conversation as discrete and disjoint packets delivered to them via their respective email servers. The UEP server residing in computing cloud 802 is configured, according to the architecture shown in FIG. 4A, to adapt the communication style and features for each participant to the capabilities of the client email interface the participant is using. For UEP clients, the UEP server provides the continuous and real-time stream of communications as described herein, while for existing email clients, it delivers messages through their respective email exchange servers. This way, all participants communicate seamlessly, each to the limits of the capabilities offered by his respective email server and email client application.

In summary, the UEP system creates a single central communication thread or data stream that is stored centrally in the cloud, for example, in UEP databases, and participants just view the thread from their client devices. UEP system does not create copies of the conversation like traditional emails do. So, when a new user enters the conversation, he sees the conversation and can participate in any branch and comment anywhere in the thread, subject to any permission restrictions. Also, if one of the participants is a standard email user, the UEP system will still merge his emails with the central conversation thread even through the standard email user himself doesn't benefit from it, but UEP does that for the benefit of the UEP users.

Figure 8B:
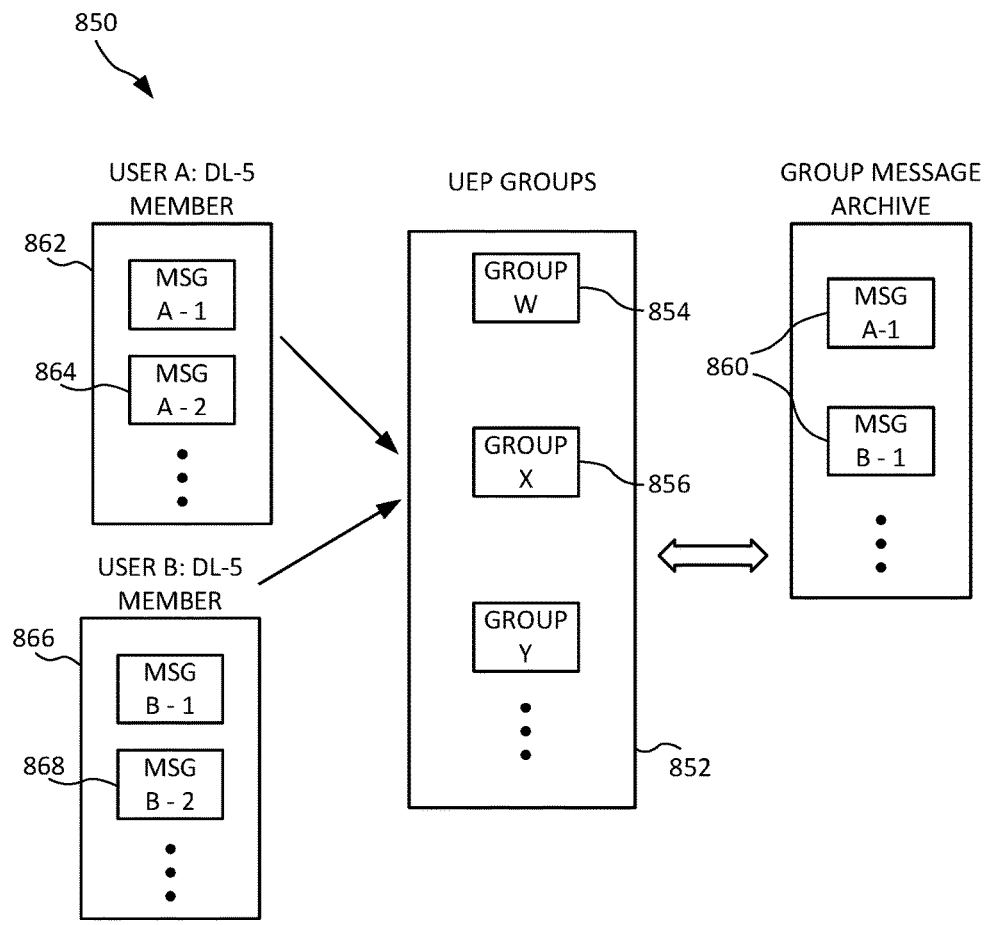
FIG. 8B shows example UEP Groups derived from users' Distribution Lists (DL) and corresponding messages stored in a group message archive.

FIG. 8B shows example UEP Groups derived from users' Distribution Lists (DL) and corresponding messages stored in a group message archive. In various embodiments UEP group environment 850 includes user A associated with mailbox 862 having messages 864, and user B associated with mailbox 866 having messages 868, each user being a member of a distribution list DL-5. The mailboxes are in communication with UEP groups software module 852 having various UEP-defined groups 854 and 856. The UEP groups module is further in communication with a group message archive containing or holding all messages MSG-A1 and MSG-B1 associated with all users who are members of the DL-5 distribution list.

In various embodiments, the UEP groups module 852 collaborates with other UEP software modules, such as some of those shown in FIG. 4A and others like contact resolver 454 (see FIG. 4B), to extract information about various Distribution Lists (DL) from the email messages. A DL is simply a list of contacts to which an email may be sent and all members of that DL will receive the same email.

A DL, typically also has an alias name that allows sending a message to one alias who will then forward to all members. UEP may identify those aliases that are actually DLs and convert them to UEP groups. The DLs may generally have been predefined within other email platforms, such as Exchange and Gmail, and are used by the users routinely. UEP groups module may use the DLs to form UEP groups which contain some or all the members of the DLs based on which the UEP groups are based. The DLs and UEP groups have complete parity and contain the same information, albeit may be in different formats. UEP may take a DL, and create an archive of all messages related to the DL. So, when a new member joins the DL, if he uses UEP he can see the history of messages and conversations sent to that DL. This way, when a message to a DL is sent to the users' (DL members) inboxes, UEP adds an archive layer that stores the messages in a central repository for future members to see. UEP also allows users to not get messages sent to a DL in the user's inbox and just go directly to the UEP group to see the new messages.

In various embodiments, the UEP groups module 852 stores the messages associated with the members of its UEP groups (such as Group W, Group X, and Group Y, in FIG. 8B). These messages are may part of a sub-thread of the virtual conversation. Based on the group message archive, the UEP determines which messages to retrieve from the group message archive and display to which users involved in various sub-threads in the virtual conversation.

Figure 9:
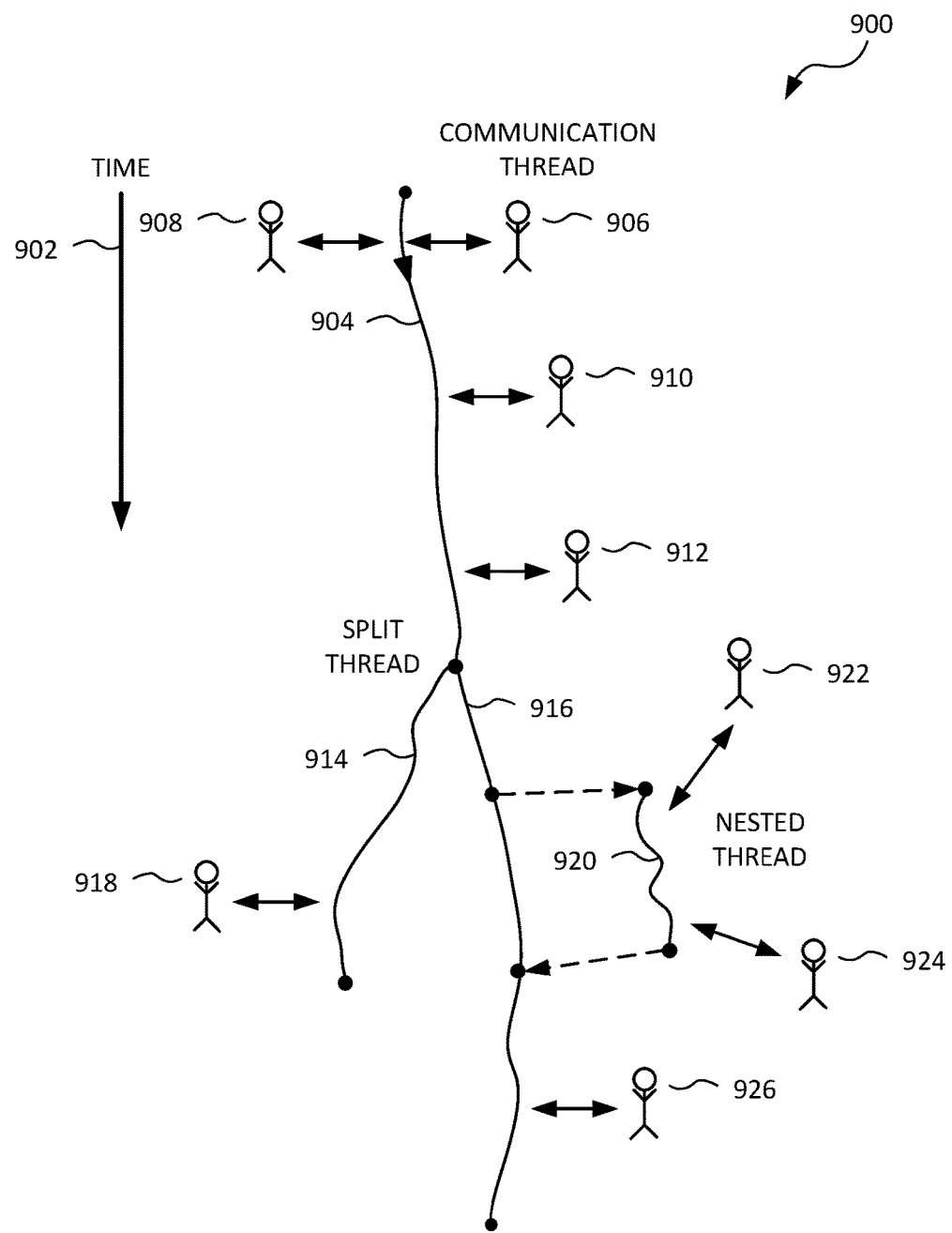
FIG. 9 shows an example communication thread over time with split and nested sub-threads.

FIG. 9 shows an example communication thread over time with split and nested sub-threads. In various embodiments, communication thread 900 may be started between two or more participants 906 and 908 and continue along main thread 904 and the time axis 902. Other participants 910 and 912 may join the conversation at different times downstream. The main thread 904 may split into 914 and 916 sub-threads with new participants 918 joining sub-thread 914. Along sub-thread 916 a nested thread may 920 may be created between participants 922 and 924, excluding other participants and rejoining sub-thread 916 at 920's termination. Other participants 926 may join in as the thread continues over time.

In various embodiments, the live, real-time, continuous communication thread 900 split and nested multiple times. A split sub-thread is a thread that includes the history of its parent thread (the thread before it from which it split) but its future content is different from its sibling sub-threads (the sub-threads that have the same parent thread) or parent. A nested sub-thread is a thread that includes the history of its parent thread but its future content is different from its parent thread for a limited duration, it rejoins its parent again (becomes the same thread) after the nested thread's termination. This generational model of parents-children-siblings can repeat recursively within each thread or sub-thread as a new parent. In some embodiments, sub-thread may be defined as starting from point of split and nesting, while in other embodiments, it may be defined as sharing and including the content in the history of its parent but then continuing separately from its parent.

A communication thread is defined as and refers mainly to the contents of the thread, but it may sometimes refer to the timing of the threads as well because the creation of new content always takes time and is thus associated with points on the time axes as well as points in the stream of contents. So, there is generally, a correspondence between points on the time axis 902 and points on the content streams represented by threads such as 904 and 916. Also, as shown in FIG. 9, a single point in time may correspond to multiple points on parallel threads (split or nested.) For example, at the point in time that participant 918 joins the conversation on thread 914, other conversations are simultaneously taking place on threads 916 and 920. So, time alone is not a unique identifier of threads. A thread is generally identified by at least one or more of its time, contents, participants, attachments, and the like, in a combination that can uniquely identify one thread with respect to others. In some embodiments, UEP may keep the same thread as long as new users/people are added to the conversation, to encourage and enhance collaboration and inclusion, and may only split to a new thread when people are removed from the conversation.

In various embodiments, each split sub-thread may include its own further split sub-threads (split or nested) recursively, while each nested sub-thread may also include its own further sub-threads (split or nested.) Each sub-thread may be handled and processed separately to the extent that it is distinguishable from other threads based on filter, permission, and search settings, among other parameters.

So, for example, a private nested sub-thread may be limited to certain participants and closed to others based on permission settings. Similarly, a user may search for threads that have particular attachment types, such as text or image attachments. Real-time updates may be sent to users who have the appropriate permissions or have asked to filter the threads based on selected filtering criteria.

Figure 10A:
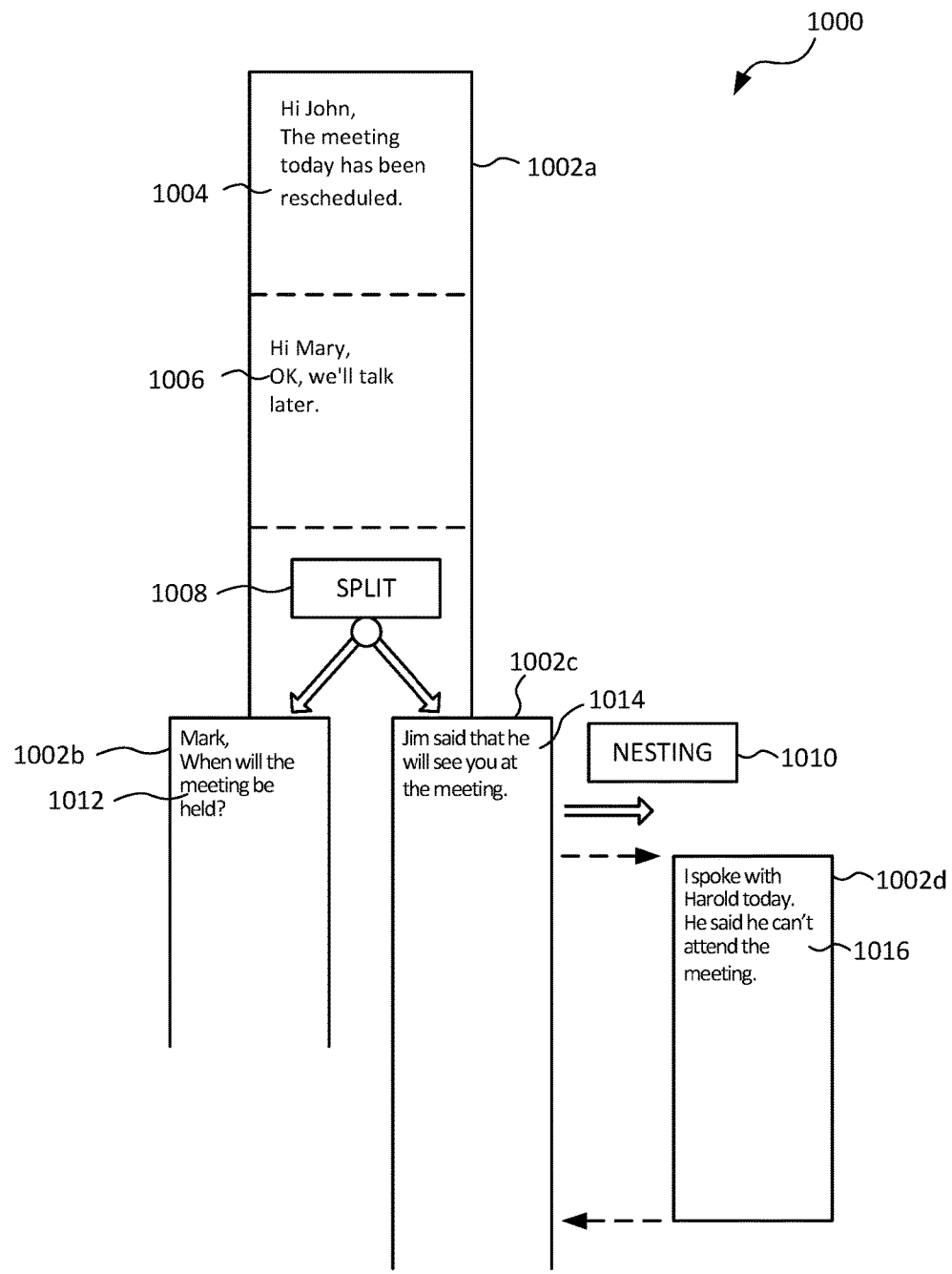
FIG. 10A shows example communication contents corresponding to the example communication thread of FIG. 9.

FIG. 10A shows example communication contents corresponding to the example communication thread of FIG. 9. In various embodiments, communication thread 1000 includes a series of distinct conversation contents or segments 1004 and 1006 between two or more participants. At some point 1008 in time or conversation, the main or starting thread 1002a may be split into sub-threads 1002b and 1002c including contents 1012 and 1012, respectively. At another point 1010 during a thread or sub-thread, a nesting sub-thread 1002d may be initiated by some participants to carry a side conversation 1016 away from other participants, returning to the parent thread after its termination.

In various embodiments, FIG. 10A depicts the thread process shown in FIG. 9 but with more details and contents to allow a clearer understanding of its operation. The points 1008 and 1010 for splitting or nesting, respectively, are decision points for a participant searching or reviewing a thread in progress or a previous thread to find desired threads or sub-threads. In various embodiments, as further described below with respect to FIGS. 10B and 10C, a user searching a previous thread or a currently live thread may be interested in a particular segment of the conversation, particular participants' remarks, particular attachments, particular time periods, and the like. In such cases, the user may start at the beginning of the thread and progress to a decision point.

A decision point may be either a split or a nesting point at which the user decides which subsequent sub-thread to follow. For a live thread, the user may wish to respond or comment in a particular sub-thread going on rather than responding to the main thread or another sub-thread. In various embodiments, the user may back up in the thread and go to a different decision point, and respond to another sub-thread. The user may be able to post multiple remarks in the live communication stream in multiple threads, all of which may be simultaneously visible to at least some of the participants, in full context of the overall thread of communications. This is in contrast to packet-based, static email that once sent becomes fixed as a separate email message and loses or has reduced context with respect to other related sub-threads, because the other sub-threads and their contents are now contained in other static messages.

Figure 10B:
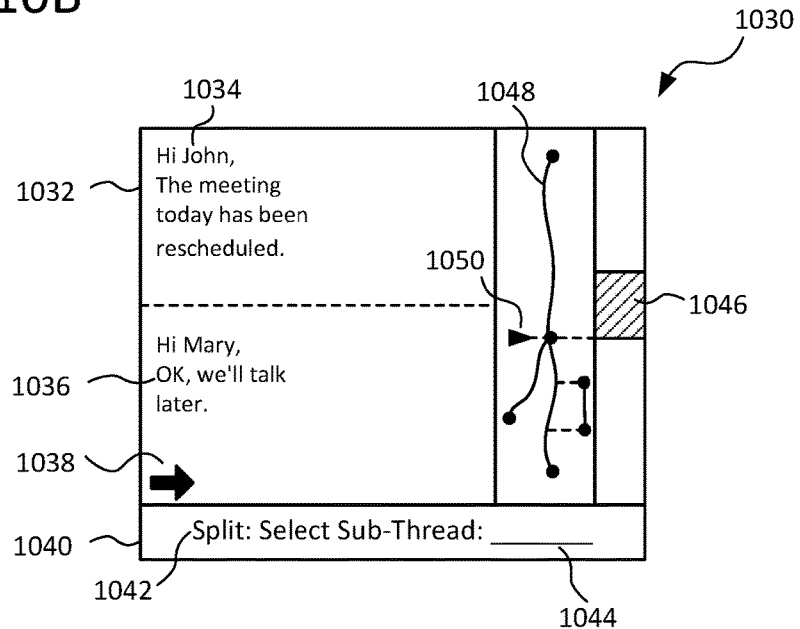
FIG. 10B shows an example user interface corresponding to the example communication thread of FIG. 9, indicating a split sub-thread to a user.

FIG. 10B shows an example user interface corresponding to the example communication thread of FIG. 9, indicating a split sub-thread to a user. In various embodiments, user interface 1030 may include a screen 1032, having contents 1034 and 1036, a decision indicator 1038, a command and/or status line 1040 with status information 1042 and user input field 1044. A separate thread pane may display the entire conversation thread and any sub-threads 1048, a thread position indicator 1050, and a screen position indicator or scroll bar 1046.

In various embodiments, screen 1032 may be viewed as a window over the conversation thread shown in FIG. 10A, controlled (moved up and down along the thread) by scroll bar 1046. The user may start at the beginning of a long thread with this user interface and scroll up and down the thread to view corresponding segments of the conversation, attachments at particular segments, split points, and nesting points. The thread pane may be used to see where the user is at any moment with respect to the whole thread. This way, the user can determine whether he is in the main thread, a sub-thread, near a split point, a nesting point, a nesting thread, and the like. This arrangement allows the user to quickly navigate to different points in a long thread. In some embodiments, the user may click (with a computer mouse or other pointing device) on a particular point on the thread in the thread pane to jump to that location in the content side of the screen 1032. The thread position indicator 1050 shows where the user is currently with respect to the overall thread 1048.

In various embodiments, the decision indicator 1038 may appear to let the user know there is a decision point, such as a split point or a nesting point. At the same time a status line message 1042 may appear to give user additional information about the decision point. The user may then use a selection indicator, such as a number or letter to indicate which sub-thread he wants to go into and explore. The selection indicator may be in the form of a pick-list, a letter, a number or other similar indicator. For example, the user may enter an "L" for Left thread or a "R" for the right thread, if the thread tree is binary. For N-ary trees (branching factor of "N", with N being an integer), the user may enter an integer less than or equal to N to indicate which branch (or sub-thread) he wants, as ordered from left to right or right to left, depending on implementation. Alternatively, the user may click on the graphical sub-thread in the thread pane as a short-cut. A benefit of the explicit selection is that for busy and long threads, it may be more accurate and provide more detailed information than the graphical thread pane.

Figure 10C:
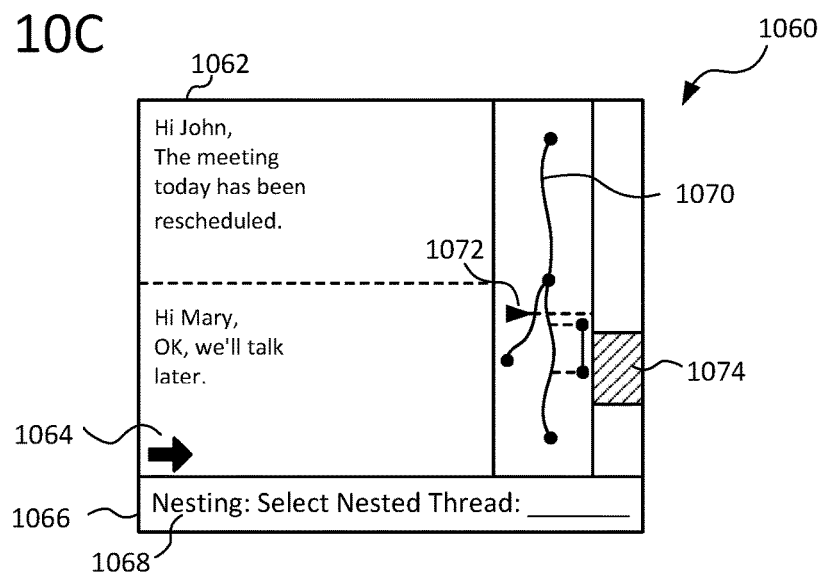
FIG. 10C shows an example user interface corresponding to the example communication thread of FIG. 9, indicating a nested sub-thread to the user.

FIG. 10C shows an example user interface corresponding to the example communication thread of FIG. 9, indicating a nested sub-thread to the user. In various embodiments, user interface 1060 is substantially similar to the user interface 1030 of FIG. 10B and may include a screen 1062, having text or other contents, a decision indicator 1064, a command and/or status line 1066 with status information 1068 adjacent to a user input field. A separate thread pane may display the entire conversation thread and any sub-threads 1070, a thread position indicator 1072, and a screen position indicator or scroll bar 1074.

In various embodiments, screen 1062 may be viewed as a window over the conversation thread shown in FIG. 10A, controlled (moved up and down along the thread) by scroll bar 1074. The user may start at the beginning of a long thread with this user interface and scroll up and down the thread to view corresponding segments of the conversation, attachments at particular segments, split points, and nesting points. The thread pane may be used to see where the user is at any moment with respect to the whole thread. This way, the user can determine whether he is in the main thread, a sub-thread, near a split point, a nesting point, a nesting thread, and the like. This arrangement allows the user to quickly navigate to different points in a long thread. In some embodiments, the user may click (with a computer mouse or other pointing device) on a particular point on the thread in the thread pane to jump to that location in the content side of the screen 1062. The thread position indicator 1072 shows where the user is currently with respect to the overall thread 1070.

In various embodiments, the decision indicator 1064 may appear to let the user know there is a decision point, such as a split point or a nesting point. At the same time a status line message 1066 may appear to give user additional information about the decision point. The user may then use a selection indicator, such as a number or letter to indicate which sub-thread he wants to go into and explore. The selection indicator may be in the form of a pick-list, a letter, a number or other similar indicator. For example, the user may enter an integer to indicate which nested sub-thread (if multiple ones exist at the same point) he wants, as ordered from left to right or right to left, depending on implementation. Alternatively, the user may click on the graphical sub-thread in the thread pane as a short-cut. A benefit of the explicit selection is that for busy and long threads, it may be more accurate and provide more detailed information than the graphical thread pane.

It will be understood that each step of the processes described above, and combinations of steps, may be implemented by computer program instructions. These program instructions may be provided to a processor to produce a machine, such that the instructions, which execute on the processor, enable implementing the actions specified. The computer program instructions may be executed by a processor to cause a series of operational steps to be performed by the processor to produce a computer implemented process such that the instructions, which execute on the processor to provide steps for implementing the actions. The computer program instructions may also cause at least some of the operational steps to be performed in parallel. Moreover, some of the steps may also be performed across more than one processor, such as might arise in a multi-processor computer system. In addition, one or more steps or combinations of steps described may also be performed concurrently with other steps or combinations of steps, or even in a different sequence than described without departing from the scope or spirit of the disclosure.

Changes can be made to the claimed invention in light of the above Detailed Description. While the above description details certain embodiments of the invention and describes the best mode contemplated, no matter how detailed the above appears in text, the claimed invention can be practiced in many ways. Details of the system may vary considerably in its implementation details, while still being encompassed by the claimed invention disclosed herein.

Particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the claimed invention to the specific embodiments disclosed in the specification, unless the above Detailed Description section explicitly defines such terms. Accordingly, the actual scope of the claimed invention encompasses not only the disclosed embodiments, but also all equivalent ways of practicing or implementing the claimed invention.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

The above specification, examples, and data provide a complete description of the manufacture and use of the claimed invention. Since many embodiments of the claimed invention can be made without departing from the spirit and scope of the disclosure, the invention resides in the claims hereinafter appended. It is further understood that this disclosure is not limited to the disclosed embodiments, but is intended to cover various arrangements included within the spirit and scope of the broadest interpretation so as to encompass all such modifications and equivalent arrangements.

What is claimed is:

1. A communication system comprising:
    a Universal Email Platform (UEP) server computing device coupled with a computer network;
    a UEP client computing device and a non-UEP client in communication with the UEP server computing device via the computer network; and
    a set of UEP components within a UEP communication stack to determine a plurality of Identifiers (ID) for each of a plurality of emails transmitted through the UEP to create a virtual single conversation from the plurality of emails, wherein the plurality of IDs includes at least two of IMI (Internet Message ID), CID (Conversation ID), TID (Thread ID), CUID (Conversation Unique ID), and TUID (Thread Unique ID).

2. The communication system of claim 1, further comprising API (Application Programming Interface) servers and UEP synchronization engines.

3. The communication system of claim 1, wherein the UEP server computing device includes at least a portion of the UEP communication stack.

4. The communication system of claim 1, wherein the UEP client computing device includes at least a portion of the UEP communication stack.

5. The communication system of claim 1, wherein the UEP server computing device uses the communication stack and UEP API functions to link and convert discrete email messages to the virtual single conversation.

6. The communication system of claim 1, wherein the plurality of emails originate from local and remote mailboxes associated with local and remote mail servers.

7. The communication system of claim 1, wherein the UEP email messages are organized into the virtual single conversation in two phases, comprising Phase I and Phase II, wherein in Phase I emails from local mailboxes at each mail server are combined into a local virtual conversation and in Phase II, all local virtual conversations are combined into a global virtual single conversation.

8. A Universal Email Platform (UEP) system comprising:
   a UEP server computing device;
   a UEP API (Application Programming Interface) server coupled with the UEP server computing device; and
   a set of UEP modules coupled with the UEP API and UEP server to determine Identifiers (ID) for email messages transmitted through the UEP server, wherein the set of UEP modules are operable to create a virtual single conversation from the email messages, and wherein the IDs includes at least two of IMI (Internet Message ID), CID (Conversation ID), TID (Thread ID), CUID (Conversation Unique ID), and TUID (Thread Unique II).

9. The UEP system of claim 8, further comprising a plurality of UEP client computing devices.

10. The UEP system of claim 8, wherein the UEP server computing device includes a UEP communication stack.

11. The UEP of system of claim 8, wherein the email messages transmitted through the UEP server are linked together based on the IDs to form the virtual single conversation.

12. The UEP of system of claim 8, wherein the set of UEP modules include at least three of conversation manager module, contact resolver module, real time messaging module, SMTP (Simple Mail Transport Protocol) converter module, groups module, and attachments and versioning module.

13. The UEP of system of claim 8, wherein the virtual single conversation is constructed in a Phase I and a Phase II, wherein in Phase I emails from local mailboxes at each mail server in communication with the UEP system are combined into a local virtual conversation and in Phase II, all local virtual conversations are combined into a global virtual single conversation.

14. The UEP of system of claim 8, wherein the virtual single conversation is updated in real-time for UEP clients by the UEP server computing device.

15. A method of communication, the method comprising:
   determining identifiers (ID) for a plurality of email messages originating from a plurality of mailboxes associated with a plurality of mail servers coupled via a computer network, wherein some of the mail servers are Universal Email Platforms (UEP), and wherein the plurality of IDs includes at least two of IMI (Internet Message ID), CID (Conversation ID), TID (Thread ID), CUID (Conversation Unique ID), and TUID (Thread Unique ID);
   performing Phase I of construction of a global virtual single conversation from some of the plurality of email messages associated with each of the plurality of the mail servers by using the IDs to link the email messages to create a local virtual conversation for each of the plurality of the mail servers; and
   performing Phase II of the global virtual single conversation by linking the local virtual conversations associated with each of the plurality of the mail servers together to create the global virtual single conversation.

16. The method of claim 15, further comprising updating the global virtual single conversation when new users join the global virtual single conversation.

17. The method of claim 15, further comprising posting notifications to the global virtual single conversation about events including a user typing a new message.

18. The method of claim 15, wherein determining IDs comprises determining at least two of IMI (Internet Message ID), CID (Conversation ID), and TID (Thread ID).

19. The method of claim 15, wherein creating the global virtual single conversation comprises creating a virtual conversation object to represent the global virtual single conversation.

* * * * *